United States Patent
Tamura et al.

(10) Patent No.: US 6,336,110 B1
(45) Date of Patent: Jan. 1, 2002

(54) SYSTEM FOR SOLVING OF A CONSTRAINT-SATISFACTION PROBLEM AND CONSTRUCTING OF A SYSTEM

(75) Inventors: Shinsuke Tamura, Yokohama; Tetsuo Hasegawa, Tokyo, both of (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/050,133

(22) Filed: Mar. 30, 1998

(30) Foreign Application Priority Data

Mar. 31, 1997 (JP) .............................. 9-081136

(51) Int. Cl.$^7$ ............................ G06F 17/00; G06E 1/00
(52) U.S. Cl. .............................. 706/46; 706/45; 706/51; 706/19
(58) Field of Search .............................. 706/46, 45, 51, 706/19

(56) References Cited

U.S. PATENT DOCUMENTS

| | | | | |
|---|---|---|---|---|
| 5,123,057 A | * | 6/1992 | Verly et al. | 382/37 |
| 5,195,172 A | * | 3/1993 | Elad et al. | 706/46 |
| 5,249,261 A | * | 9/1993 | Natavajan | 706/46 |
| 5,267,346 A | * | 11/1993 | Maruyama et al. | 706/46 |
| 5,276,775 A | * | 1/1994 | Meng | 706/45 |
| 5,636,328 A | * | 6/1997 | Kautz et al. | 706/45 |
| 5,855,009 A | * | 12/1998 | Garcia et al. | 706/45 |

OTHER PUBLICATIONS

Mohan, R., "Application of Neural Constraint Satisfaction Networks", IEEE IJCNN, (abstract), Jun. 1989.*
Gilleron et al, "Solving Systems of Set Constraints With Negated Subset", IEEE Proceedings of 34th Annual Symposium Foundations of Computer Science. Nov. 1993.*
Bernard Nadel, "Representation Selection for Constraint Satisfaction: A Case Study Using N–Queens", IEEE Expert, Jun. 1990.*
Thomas Ellman, "Abstraction Via Approximate Symmetry", IEEE Proceedings of the 13th Inter. Joint Conf. on Artificial Intelligence, Aug.–Sep. 1993.*
W. Eric L., "The Combinatorics of Heuristic Search Termination for Object Recognition in Cluttered Environments", IEEE Transactions on Pattern Analysis and Machine Intelligence, Sep. 1991.*
Benhamou et al, "Combining Local Consistency, Symbolic Rewriting and Interval Methods", Proceedings of the International Conference on Artificial Intelligence and Symbolic Mathematical Computation, Sep. 1996.*

(List continued on next page.)

*Primary Examiner*—George B. Davis
(74) *Attorney, Agent, or Firm*—Oblon, Spivak, McClelland, Maier & Neustadt, P.C.

(57) ABSTRACT

A system and method for processing a large constraint satisfaction problem quickly, including a subset generating module (1), which divides a set of alternatives provided for a plurality of parts of a given problem into a plurality of subsets, such that each subset has not more than two alternatives for each part. For each subset generated by the division, a solution calculation module (2) finds a solution by calculating combinations of alternatives satisfying a constraint between alternatives selected for each two parts. The calculation of a solution for a subset, such that each subset has not more than two alternatives for each part, requires a very short period of processing time, even if the parts are many. Thus, the sum of the times required for finding a solution for all the subsets is much shorter than the time required for finding a solution for the original problem without such processing.

4 Claims, 19 Drawing Sheets

OTHER PUBLICATIONS

Liu et al, "Emergent Constraint Satisfaction through Multi-Agent Coordinated Interaction", the 5th Europen Workshop on Modelling Autonomous Agents in a Multi-Agent World, Aug. 1993.*

Jeavons et al, "A Substitution Operation for Constraints", Proceedings of the 2nd Inter-Workshop on Principles and Practice of Constraint Programming, May 1994.*

Dago et al,"No good Recording for Valued Constraint Satisfaction Problems", IEEE Proceedings of the 8th Inter-Conf. on Tools with Artificial Intelligence, Nov. 1996.*

Rina Dechter, et al., "Network-Based Heuristics for Constraint-Satisfaction Problems," Artificial Intelligence, vol. 34, (1988), pp. 1–38.

Vipin Kumar, "Algorithms for Constraint-Satisfaction Problems: A Survey," AI Magazine, vol. 13, No. 1, (Spring 1992), pp. 32–45.

Eugene C. Freuder, Automated Reasoning, pp. 4 to 9, "Complexity of K-Tree Structured Constraint Satisfaction Problems".

* cited by examiner

SYSTEM FOR SOLVING OF A CONSTRAINT-SATISFACTION PROBLEM AND CONSTRUCTING OF A SYSTEM

BACKGROUND OF THE INVENTION

1. Field of the Invention

This invention relates to an improvement in the technology for calculating a solution of a so-called constraint-satisfaction problem so that a large problem may be solved speedily.

2. Description of the Related Art

A constraint-satisfaction problem is known as a problem for assigning a set of consistent values to a set of variables. A set of consistent values means that these values satisfy combinational constraints defined of the set of variables. Hereafter, each variable is corresponded to a part of a thing e.g., a system, a product, etc., and each value is corresponded to an alternative to implement the part. Each part may be provided with multiple choices (alternatives) and constraints, such as permissible and impermissible combinations, exist on a combination of alternatives selected respectively for different parts. A solution for the constraint-satisfaction problem is a combination of alternatives that may be applied to all parts so that all constraints are satisfied.

An example of the constraint-satisfaction problem is shown below. Assume that machine X consists of four parts, A, B, C, and D, and that three implementation methods are provided for each of the four parts. That is, implementation methods a1, a2, and a3 (hereafter represented as {a1, a2, a3}) are provided for part A, {b1, b2, b3} for part B, {c1, c2, c3} for part C, and {d1, d2, d3} for part D. Each choice (for example, implementation method a1) for a part is called an alternative.

In addition, assume that there is a constraint that the same implementation number cannot be used between each two parts: that is, between, A and B, A and C, A and D, B and C, B and D, and C and D. For example, if the implementation method of part A is aj (j=1, 2, 3), then the implementation methods of parts B, C, and D must be bk, ck, and dk (k≠j), respectively. Similarly, if the implementation method of part B is bj (j=1, 2, 3), then the implementation methods of parts C and D must be ck and dk (k≠j), respectively. If the implementation method of part C is cj (j=1, 2, 3), then the implementation method of part D must be dk (k≠j).

Under the constraint described above, consider selecting implementation methods A, B, C, and D to design machine X so that all the conditions required for a combination (combination conditions) are satisfied. In this example, since there is not any combination of implementation methods, or any solution, which satisfies all the combination conditions, machine X cannot be designed. However, making of this judgment on the constraint-satisfaction problem requires that all the combinations of the implementation methods for each part are checked, as shown below, to see whether they satisfy the combination conditions:

{a1, b1, c1, d1}
{a1, b1, c1, d2}
{a1, b1, c1, d3}
{a1, b1, c2, d1}
{a1, b1, c2, d2}

As understood from the combinations above, it is difficult for a designer to make such a judgment even if combinations for only four parts are checked as this example. If combinations for a more large number of parts are checked, it becomes more difficult to make such a judgment. For example, if there are as many as 30 parts and four implementation methods are provided for each of the four parts, a huge number of combinations of alternatives must be checked. It is virtually impossible to check each combination as described above. For this reason, a solution for a constraint-satisfaction problem has been found, in most cases, using a trial-and-error method based on experience.

The constraint-satisfaction problem is not limited to a field where an alternative must be selected for each of the parts that make up a machine such as the one described above. The problem may be applied to many other fields too; for example, it may be applied to how parameters should be specified for each part of a software product or how a plurality of objects should be arranged in a limited area. Therefore, the constraint-satisfaction problem occupies a very important position, for example, in building an expert system.

In general, the constraint-satisfaction problem is defined as follows. That is, when a system (problem) includes a plurality of parts each having a finite number of alternatives used for implementation of each part or its function and when there is a constraint on the combination of two alternatives of each pair of parts in said plurality of parts, the constraint-satisfaction problem is a problem that finds an alternative satisfying the constraint for each part.

However, except a special case, the constraint-satisfaction problem is an NP complete problem. Here, let y-th power of x be represented as "x^y". Then, the NP complete problem refers to a problem whose amount of calculation for solving the problem may be represented as described below. That is, let the number of parts be N, and the maximum number of alternatives allowed for each part be d. In this case, finding of a combination of alternatives consistent with all parts may require d^N calculation at the maximum. For example, if N is 100 and the maximum number of alternatives is 2, 2^100 calculations may be necessary at the maximum. It is impossible to carry out such calculations within a time expendable in practical applications.

As a method for solving for the constraint-satisfaction problem, there is a method which reduces the amount of calculation by localizing the range affected by a constraint. (Reference: Rina Dechter, Judea Pearl: "Network-Based Heuristics for Constraint-Satisfaction Problems", Artificial Intelligence 34 (1988)). However, during calculation, this method introduces constraint relations which do not exist at first and therefore requires about d^N calculations in many cases.

A polynomial calculation method is also available for solving a problem where a constraint graph representing a constraint relation between parts is represented as a tree structure or as a K-tree structure which is an extension of a tree structure (Reference: Eugene Freuder, "Complexity of K-Tree Structured Constraint Satisfaction Problems"). However, this method requires conditions that are rarely satisfied in a practical application.

For the reason described above, a conventional method for solving the constraint-satisfaction problem, which is very important in building an expert system, has been capable of handling very small-scaled problems only, except special cases such as when problems are represented as tree-structured graphs representing the constraint relation between parts.

Consequently, it is desired to provide a system and a method which are useful for solving a large constraint-satisfaction problem at a high speed. Also, it is desired to provide a system and a method which are useful for building a machine or a computer program system, including a plurality of parts for each of which a plurality of alternatives are provided when constraints exist on combinations of alternatives for different parts, in such a manner that the constraint is satisfied more easily than the related art.

SUMMARY OF THE INVENTION

In an aspect, the present invention is a system for calculating a solution of a constraint-satisfaction problem including a plurality of parts for each of which a plurality of alternatives are provided when a constraint exists on a combination of alternatives selected respectively for different parts in said plurality of parts. The system divides a set of alternatives provided for a plurality of parts of a given problem to be solved into a plurality of subsets such that each subset has not more than two alternatives for each part, and analyzes a combination of alternatives for each subset to check whether the combination of alternatives satisfies said constraint, whereby allowing a solution of the problem to be calculated from the analyzed combination. Calculation of a solution for a subset in which each part has not more than two alternatives, requires a very short period of time even if the problem includes many parts. This means that the sum of the times required for finding solutions for all the subsets, is much shorter than the time required for finding a solution for the original problem as it is. Thus the system is useful for solving a large constraint satisfaction problem at a high speed.

Preferably, the system may calculate a reachable value set representing a combination of sets of alternatives defined on each part satisfying said constraint for each of said plurality of subsets, complete the calculated reachable value set, and calculate a solution from the completed reachable value set. The calculation of a reachable value set can be carried out in a very short time even if the problem includes many parts. Thus the system greatly reduces the time required for calculating a solution of the whole problem.

In another aspect, the present invention is a system for constructing a system including a plurality of parts for each of which a plurality of alternatives are provided when a constraint exists on a combination of alternatives selected respectively for different parts in said plurality of parts. The constructing system divides a set of alternatives provided for a plurality of parts of a given system to be constructed into a plurality of subsets such that each subset has not more than two alternatives for each part, and constructs a system which satisfies said constraint by calculating a combination of alternatives which satisfies said constraint for each of said plurality of subsets. The constructing system is useful for constructing a complicated system which includes many parts when a constraint exists on a combination of alternatives for different parts, more easily than the constructing system according to the related art.

Other and further objects, features, and advantages of the invention will appear more fully from the following description.

DESCRIPTION OF PREFERRED EMBODIMENTS

A system for solving a constraint-satisfaction problem (hereafter called this system), an embodiment of the present invention (hereafter called an embodiment), is described below with reference to the attached drawings.

(1) Configuration

Figure 1:
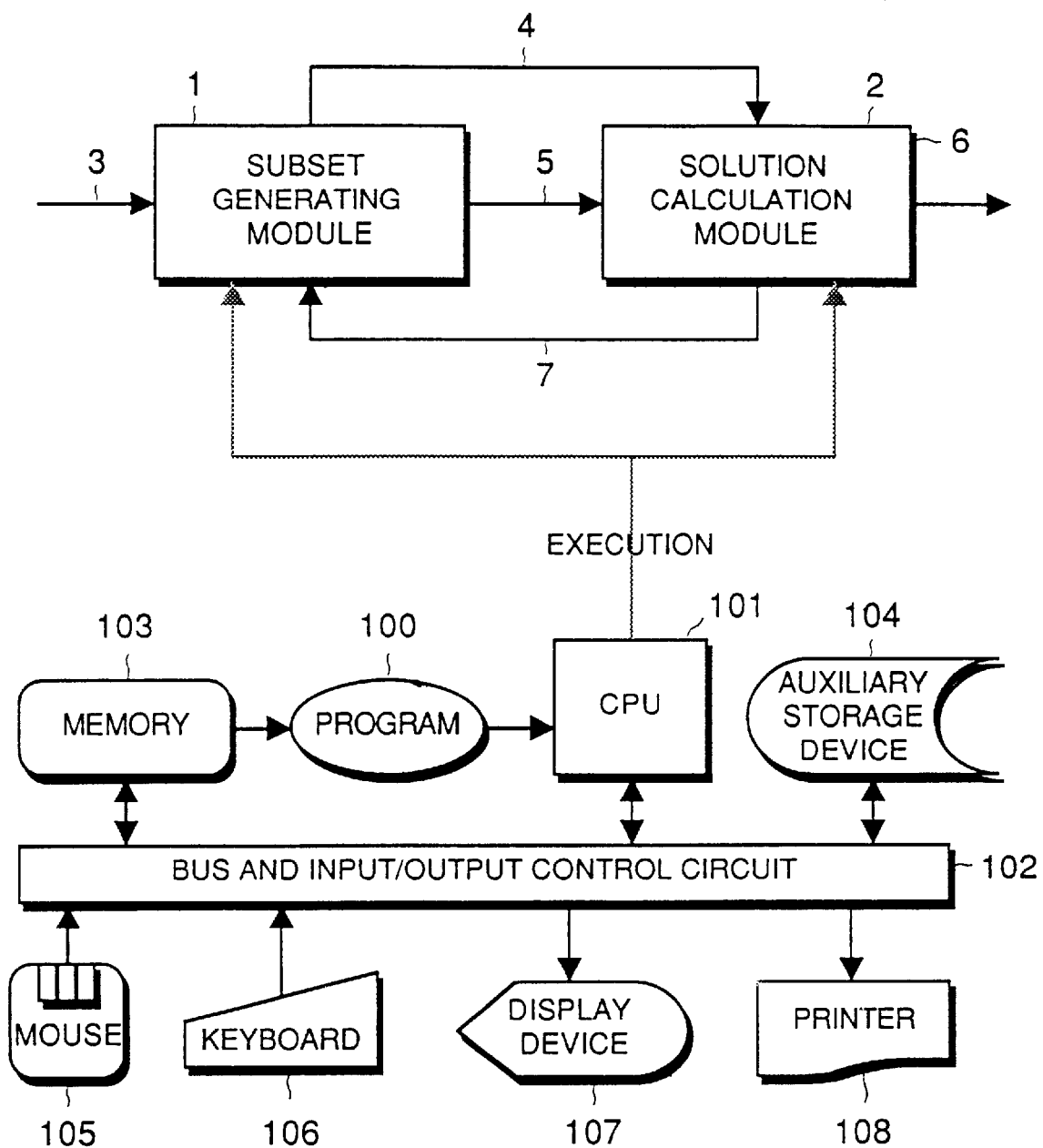
FIG. 1 is a functional block diagram showing schematically the configuration of principal elements of a constraint satisfaction problem solving system used in an embodiment of the present invention.

FIG. 1 is a functional block diagram showing schematically the configuration of principal elements of this system. As shown in FIG. 1, a CPU 101 controlled by a program 100 which runs on a computer executes this system. In the following description, the term "module" is used for each virtual circuit block corresponding to each function of this system because various embodiments are possible. The CPU 101 uses various computer hardware resources, as instructed by an instruction from the program 100, to execute the operation of each virtual circuit block.

Typical hardware resources include a memory 103 composed of memory devices such as RAM, an auxiliary storage device 104 such as a hard disk drive, a mouse 105 and a keyboard 106 used as input devices, a display device 107 and a printer 108 used as output devices, any of which may be connected to the CPU 101 through a bus and input/output control circuit 102. Note that these hardware resources are no more than examples; other devices also may be used, which can serve the purposes such as data storage, input, and output.

This system, which is implemented using these hardware resources, is configured as described below. As shown in FIG. 1, this system comprises two principal elements. One of the elements is a subset generating module 1 which receives a problem from a path 3 and divides it into subsets and the other is a solution calculation module 2 which calculates a solution of the problem from divided subsets. The subset generating module 1 is means for dividing a set of alternatives provided for a plurality of parts of a given problem into subsets such that each subset has not more than two alternatives for each part. The modules 1 and 2 are connected with each other through paths 4, 5, and 7. The path 5 is used for sending a subset from module 1 to module 2, while the path 4 is used for sending a combination constraint, associated with each subset, to the solution calculation module 2. The path 7 is used by module 2 that has completed the processing of a subset, for requesting module 1 to send the next subset. The solution calculation module 2 finds a solution from a subset and outputs it through a path 6.

Figure 2:
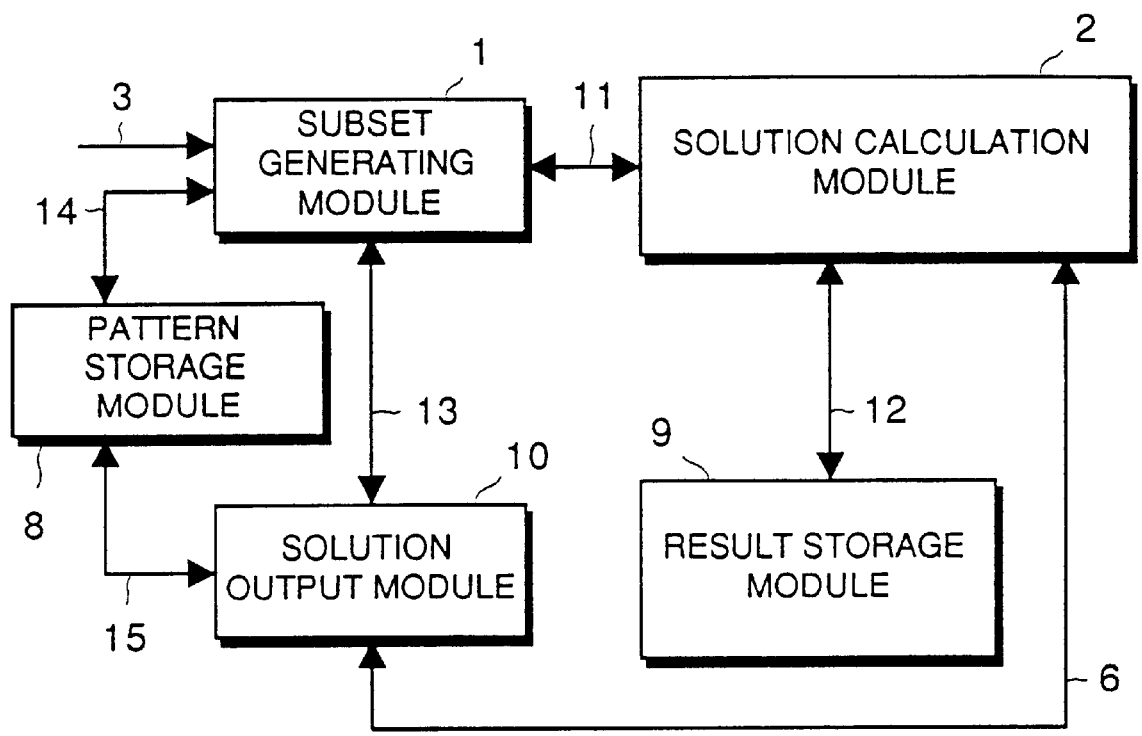
FIG. 2 is a functional block diagram showing more concretely the configuration of FIG. 1.

FIG. 2 is a functional block diagram showing more concretely the configuration of the system. In FIG. 2, the paths 4, 5, and 7 of FIG. 1 are shown collectively as a single path 11. The paths 3 and 6 correspond to the paths 3 and 6 in FIG. 1, respectively. As shown in FIG. 2, this system comprises subset generating module 1 and solution calculation module 2 as well as a pattern storage module 8, a result storage module 9, and a solution output module 10. The pattern storage module 8 stores a solution calculation pattern which is entered by a user, specifying whether only one solution is to be obtained or all solutions are to be obtained. The result storage module 9 stores results calculated by module 2. The solution output module 10 requests module 2 to send at least one solution according to a solution calculation pattern stored in module 8 and outputs the returned at least one solution to the user. The solution calculation module 2 returns at least one solution stored in module 9 to module 10 when the sending of at least one solution is required by module 10.

Figure 3:
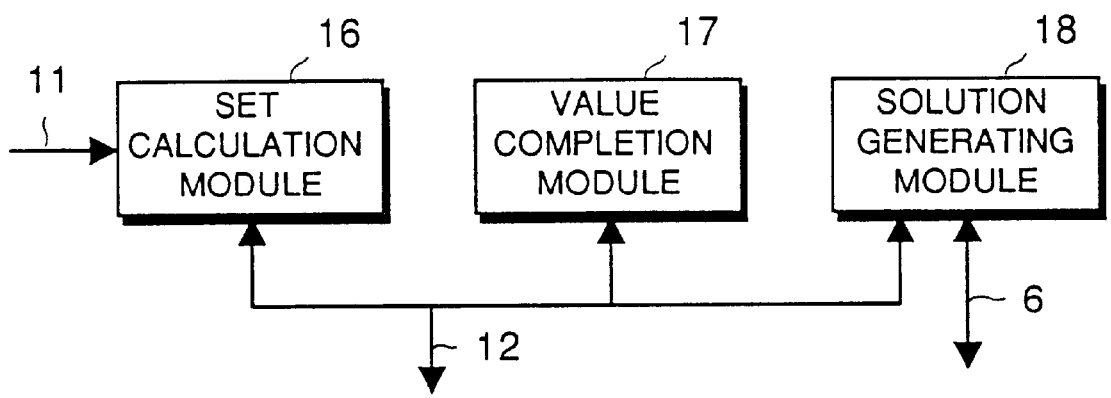
FIG. 3 is a functional block diagram showing concretely the configuration of a solution calculation module used in the embodiment of the present invention.

FIG. 3 is a functional block diagram showing concretely the configuration of solution calculation module 2. As shown in FIG. 3, the solution calculation module 2 comprises a set calculation module 16 which receives a subset from path 11 and calculates a reachable value set representing a combination of alternatives satisfying the constraint, a value completion module 17 which completes a calculated reachable value set, and a solution generating module 18 which calculates a solution from the completed reachable value set.

(2) Operation

The embodiment with the configuration described above calculates a solution of a problem according to the procedure described below. First, the terms used in the following description are described. A combination of alternatives of different parts, which satisfies all constraints, is called a solution of the system or the problem. If an alternative of part $Xk$ is constrained by an alternative of part $Xj$, part $Xk$ and part $Xj$ are called to be mutually adjacent. A set of all parts adjacent to part $Xk$, which is called an adjacent set of part $Xk$, is represented as $N(Xk)$. If part $Xk$ and part $Xj$ are adjacent, and the alternative $wk$ of part $Xk$ and the alternative $wj$ of part $Xj$ satisfy the combination constraint, the alternatives $wk$ and $wj$ are called to be connectable. If there is a mutually-connectable alternative list $\{wj, \ldots, wk\}$ for a mutually-adjacent part list $\{Xj, \ldots, Xk\}$, the alternative $wk$ of part $Xk$ is called to be reachable from the alternative $wj$ of part $Xj$. In this case, $\{Xj, \ldots, Xk\}$ may contain the same part $Xh$ more than once, and the alternative of part $Xh$ which is neither part $Xj$ nor part $Xk$ may be different every time it appears. In addition, a reachable value set of part $Xj$ with respect to the alternative $wk$, represented as $r(Xj: wk)$, is defined as a set of alternatives of part $Xj$ which includes only alternatives reachable from alternative $wk$.

(2-1) Input of a Problem

When solving a problem, a user supplies the problem and its constraint to subset generating module 1 through path 3 and requests the beginning of the processing. When requesting the beginning of the processing, the user also enters a solution calculation pattern specifying whether only a given number m of solutions are to be calculated or all solutions are to be calculated. The subset generating module 1 stores the specified pattern in pattern storage module 8 through a path 14.

A given problem is represented by a set of parts included in the problem and by a set of alternatives each permissible for each part. A constraint on the problem is a constraint on a combination of alternatives of the parts. It is represented by a set of part pairs each having a constraint between its two parts and by a combination of alternatives permissible or impermissible for the two parts of each pair.

That is, a problem is given as:

Set X of parts $X=\{X1, X2, \ldots, XN\}$

List of alternative sets each permissible for a part $V=\{V1, V2, \ldots, VN\}$

Set of part pairs each having a constraint between its two parts $Z=\{(Xi, Xj), (Xk, Xm), \ldots\}$ A constraint, which is a combination of alternatives permissible for each pair$(Xi, Xj)$, is represented as follows:

$Cij=\{(wip, wjq), (wir, wjs), \ldots\}$

The subset generating module 1 receives input data representing the problem and the constraint each in the following form:

X1, X2, ... XN

V1, V2, .... VN (Xi, Xj)=(wip, wjq), (wir, wjs), ...

(Xk, Xm)=(wkt, wmu), (wkv, wmy), ...

(2-2) Division into Subsets

The subset generating module 1 divides the given problem into a plurality of subsets such that each subset has not more than two alternatives for each part. In this dividing of the problem, module 1 first divides the alternatives of each part into a plurality of groups each having not more than two alternatives and then combines groups for different parts according to the permutation-and-combination rule to form a plurality of subsets.

For example, assume that alternatives a1, a2, a3, and a4 are provided for part A and alternatives b1, b2, b3, and b4 for part B. In this case, the alternatives of part A are divided into two groups {a1, a2} and {a3, a4}, and the alternatives of part B into two groups {b1, b2} and {b3, b4}. Then, the respective groups of parts A and B are combined into the following four subsets:

{a1, a2} and {b1, b2}
{a1, a2} and {b3, b4}
{a3, a4} and {b1, b2}
{a3, a4} and {b3, b4}

That is, module 1 gets a set Vj of alternatives permissible for each of all parts Xj and divides the set into a list of subsets {Vj(1), Vj(2), ..., Vj(jm)} such that each subset has not more than two alternatives for each part.

A specific technique to be used for dividing can be determined according to the characteristics of a problem to which the system is to be applied. For example, a user having understood a specific problem would have no trouble in entering a division rule most suitable for the problem. This allows the user to apply different division rules for different problems respectively, resulting in applying of the most suitable rule for each of the problems.

(2-3) Sending of a Subset to Solution Calculation Module

The subset generating module 1 sends data representing subsets and its constraint in the form below, to solution calculation module 2 through the path 11.

X1, X2, XN

V1(1), V2(2), VN(1)

(Xi, Xj)=(wip, wjq), (wir, wjs), . . .

(Xk, Xm)=(wkt, wmu), (wkv, wmy), . . .

. . .

In this case, module 1 selects the combinations of alternatives permissible for a pair of parts (Xi, Xj) having a constraint between them as follows. That is, from given pairs (wip, wjq), the module selects only combinations in which one alternative wip is included in the alternative Vi of the subset and the other alternative wjq is included in the alternative Vj of the subset.

The subset generating module 1 sends a subset to solution calculation module 2 according to the specified solution calculation pattern as follows. Upon completion of the calculation of one subset, module 2 sends to module 1 through path 11, information indicating that processing has ended and whether a solution is present. After receiving from module 2 information indicating the presence of a solution, module 1 sends the next data to module 2 unless a pattern stored in module 8 indicates that only one solution is to be obtained (that is, when the specified number of solutions have not yet been obtained or the specified pattern indicates that all solutions are to be obtained).

The subset generating module 1 sends the following data to solution calculation module 2 at a time:

X1, X2, . . . , XN

V1(1), . . . , VN−1(1), VN(2)

(Xi, Xj)=(wip, wjq), (wir, wjs), . . .

(Xk, Xm)=(wkt, wmu), (wkv, wmy), . . .

When module 1 sequentially generates subsets, it sends alternative sets to module 2 similarly in lexicographical order. The following data is sent sequentially:

{V1(1), . . . , VN(1)}

{V1(1), . . . , VN−1(1), VN(2)}

{V1(1), . . . , VN−1(1), VN(3)}

. . .

{V1(1), . . . , VN−1(1), VN(NT)}

{V1(1), . . . , VN−1(2), VN(1)}

{V1(1), . . . , VN−1(2), VN(2)}

. . .

{V1(1), . . . , VN−1(2), VN(NT)}

{V1(1), . . . , VN−1(3), VN(1)}

{V1(1), . . . , VN−1(3), VN(2)}

. . .

{V1(1), . . . , VN−1(3), VN(NT)}

{V1(1), . . . , VN−1(2T), VN(NT)}

In this case, module 1 sends data to module 2 through path 11 as shown below until it receives information indicating that a solution has been found or until it completes the sending of the system configuration data corresponding to {V1(1), . . . , VN−1(2T), VN(NT)}:

X1, X2, . . . , XN

V1(j1), V2(j2), . . . , VN(jN)

(Xi, Xj)=(wip, wjq), (wir, wjs), . . .

(Xk, Xm)=(wkt, wmu), (wkv, wmy), . . .

When all solutions are required, subset generating module 1 must send all subsets to solution calculation module 2. In this case, all subsets may be sent to module 2 at a time. Also, the subsets may be sent sequentially by generating a subset at every calculation. When all subsets are sent at a time, path 7 is not used since it is used for requesting the next subset.

When subsets are sequentially generated and sent, subset generating module 1 generates one subset at a time and sends it to solution calculation module 2. The module 2 calculates a solution of a subset received through path 5. The module 2 sends a request for sending of the next alternative set to module 1 through the path 7 when the calculation of a subset ends or when module 2 anticipates that the calculation is going to end. In response to the request, module 1 sends a new alternative set and, if necessary, information on permissible or impermissible alternative combinations to module 2 through paths 5 and 4, respectively. Note that the calculation of a subset also ends when it is found that there is no solution.

(2-4) Calculation of a Solution

When the solution calculation module 2 has received subsets {V1(k1), V2(k2), . . . , VN(kN)} through path 5, it calculates a combination of alternatives having a consistency for all parts, assuming that alternatives Vj(kj), or not more than two alternatives are permissible for each part Xj. It is assumed that the whole problem includes parts {X1, . . . , XN} and that each group {wj1, wj2}, which has not more than two alternatives for each part Xj, is sent from module 1 to module 2 as a group of alternatives permissible for each part Xj. Note that, when a solution is obtained from a set of alternatives permissible for each part which is given as input data, the solution is obtained by using one of subsets {V1(k1), V2(k2), . . . , VN(kN)} ($1 \leq kj \leq jm$) as a set of alternatives. This means that a solution obtained from these subsets is equivalent to that obtained from the whole problem. As described below, calculation of a solution in module 2 is carried out by calculating a reachable value set, completing the reachable value set, and calculating a solution from the completed reachable value set.

(2-4-1) Calculating a Reachable Value Set (steps 41–49)

Figure 4:
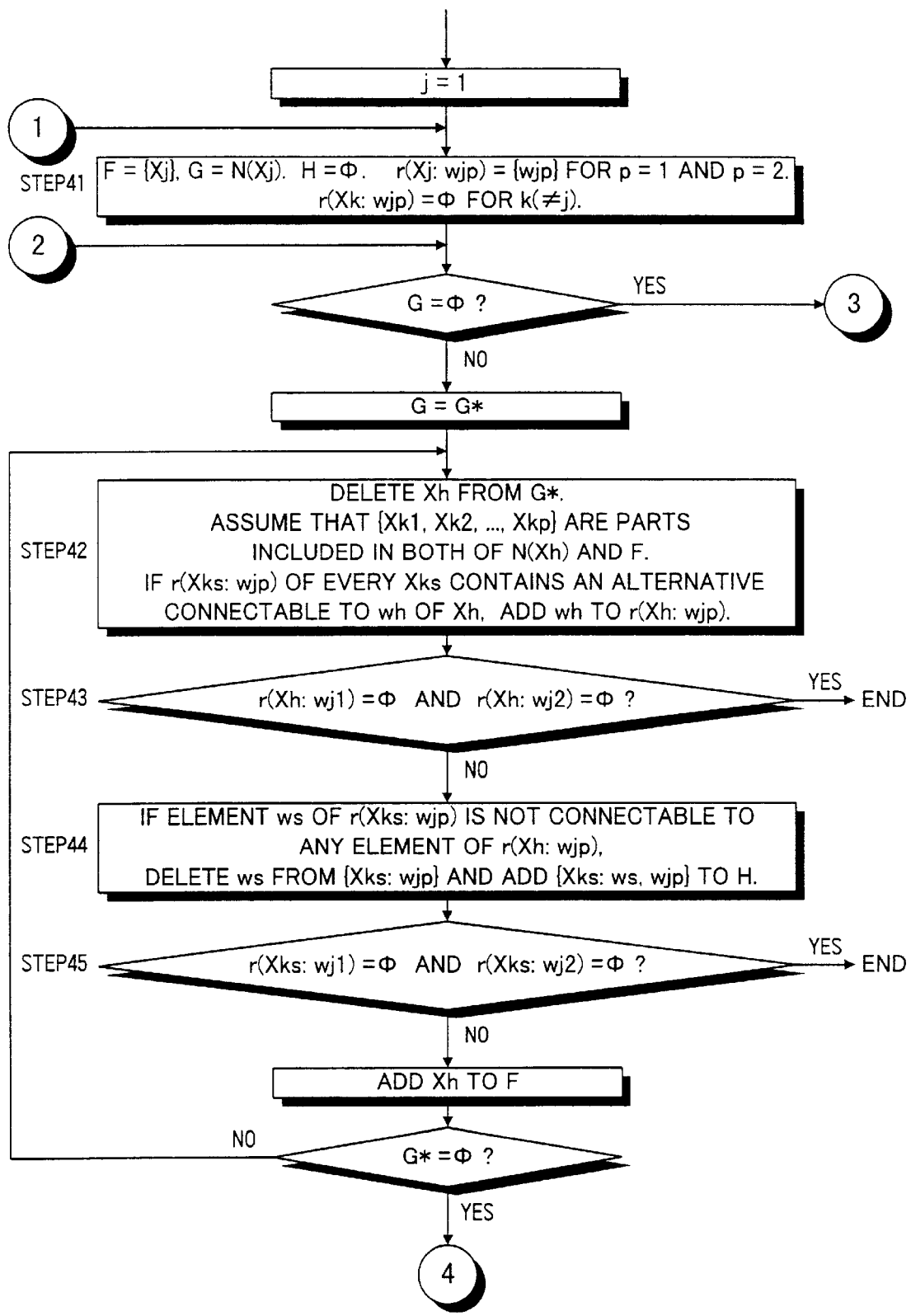
FIGS. 4 and 5 are respectively first and second parts of a flowchart showing a procedure for calculating a reachable value set used in the embodiment of the present invention.
Figure 5:
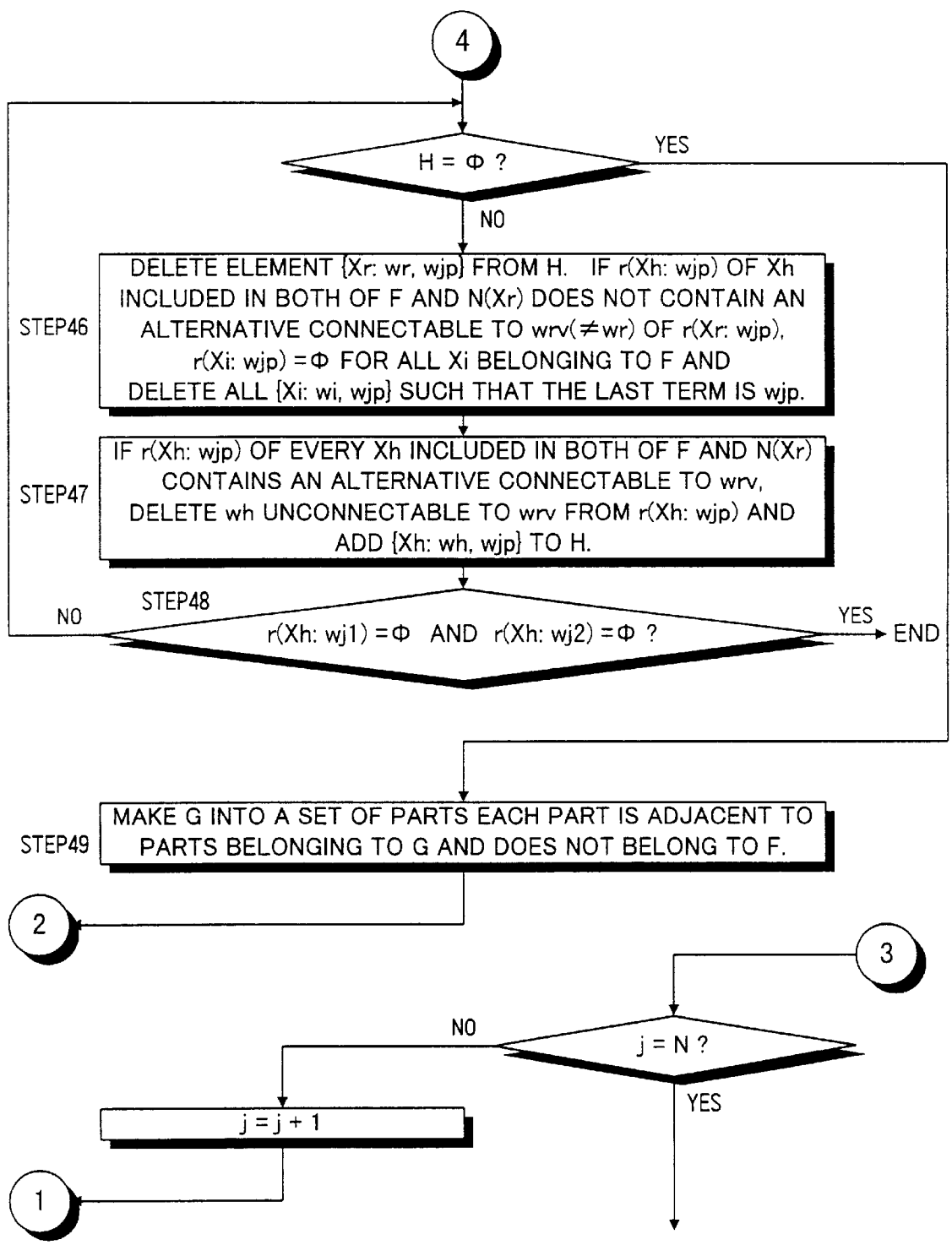

FIG. 4 and FIG. 5 are respectively first and second parts of a flowchart showing a procedure for calculating a reachable value set. The first and second parts are connected by connectors 1–4.

First, the set calculation module 16 calculates a reachable value set r(Xj: wk) for each alternative wjp(p=1, 2) of part Xj(steps 41–49). In this calculation, for each alternative wjp(p=1, 2) of part Xj, module 16 first makes reachable value set r(Xj: wjp) of part Xj into a set including only alternative wjp, and makes reachable value set r(Xk: wjp) of part Xk(k≠j), which is not part Xj, to an empty set. In step 41, a set of parts for which a reachable value set r(Xh: wjp) has been calculated is represented as a calculated set F, a set of parts for which a reachable value set r(Xh: wjp) is to be calculated is represented as a uncalculated set G, and a set of deletion information on that an alternative has been deleted from a reachable value set r(Xh: wjp) in the following steps, is temporarily stored and represented as a deletion set H.

In steps 42 to 45, the module 16 calculates a reachable value set r(Xh: wjp) for each part Xh belonging to uncalculated set G. The uncalculated set G* used in this procedure is a reproduction of uncalculated set G. In step 42, if reachable value set r(Xks: wjp) of every part Xks belonging to calculated set F and adjacent to part Xh, contains an alternative connectable to an alternative wh of part Xh, module 16 first adds alternative wh to reachable value set r(Xh: wjp). In addition, in step 43, if both of reachable value sets r(Xh: wj1) and r(Xh: wj2) are empty, the module ends the processing because there is no solution.

If either reachable value set r(Xh: wj1) or reachable value set r(Xh: wj2) is not empty, module 16 deletes an alternative which is not connectable to any alternative of reachable value set r(Xh: wjp) from reachable value set r(Xks: wjp) in step 44. That is, if alternative ws of reachable value set r(Xks: wjp) is not connectable to any alternative of reachable value set r(Xh: wjp), the module deletes the alternative ws from the reachable value set r(Xks: wjp) because the alternative ws is not connectable from the alternative wjp. At the same time, the module adds deletion information {Xks: ws, wjp} to deletion set H in order to calculate an alternative to be deleted according to the deletion of alternative ws.

In step 45, if both of reachable value sets r(Xks: wj1) and r(Xks: wj2) are empty, module 16 ends the processing, as in step 43, because there is no solution.

When reachable value sets r(Xh: wjp) of all parts Xh belonging to uncalculated set G have been calculated by repeating steps 42 through 45, module 16 calculates, in steps 46 and 47, alternatives to be deleted according to that alternatives belonging to the deletion set H have been deleted from the reachable value set. In step 46, the module deletes deletion information {Xr: wr, wjp}, which is on that an alternative has been deleted reachable value set, from deletion set H. If reachable value set r(Xh: wjp) of part Xh, which is included in both of sets F and N(Xr), does not contain an alternative connectable to alternative wrv, which is not alternative wr belonging to reachable value set r(Xr: wjp), the module makes reachable value set r(Xi: wjp) into an empty set for all parts Xi belonging to calculated set F because there is no solution in which alternative wjp is selected for part Xj. In addition, the module deletes all information {Xi: wi, wjp} such that the last term is equal to alternative wjp, from deletion set H.

If reachable value set r(Xh: wjp) of every part Xh, which is included in both of sets F and N(Xr), includes an alternative connectable to alternative wrv, module 16 deletes alternative wh, which is not connectable to alternative wrv, from reachable value set r(Xh: wjp) and adds deletion information {Xh: wh, wjp} to deletion set H in step 47. In step 48, if both of reachable value sets r(Xh: wj1) and r(Xh: wj2) are empty, the module ends the processing because there is no solution.

When deletion set H becomes empty, in step 49, module 16 makes uncalculated set G of parts, for which reachable value set is to be calculated, into a set of parts such that each part belongs to an adjacent set of parts belonging to uncalculated set G and does not belong to calculated set F.

Finally, if each part Xk has an alternative wj that prevents reachable value sets r(Xk: wj) of all parts Xk from becoming empty, there is a solution. The set calculation module 16 writes reachable value set r(Xk: wj) into result storage module 9 through a path 12.

(2-4-2) Completion of a Reachable Value Set

Figure 6:
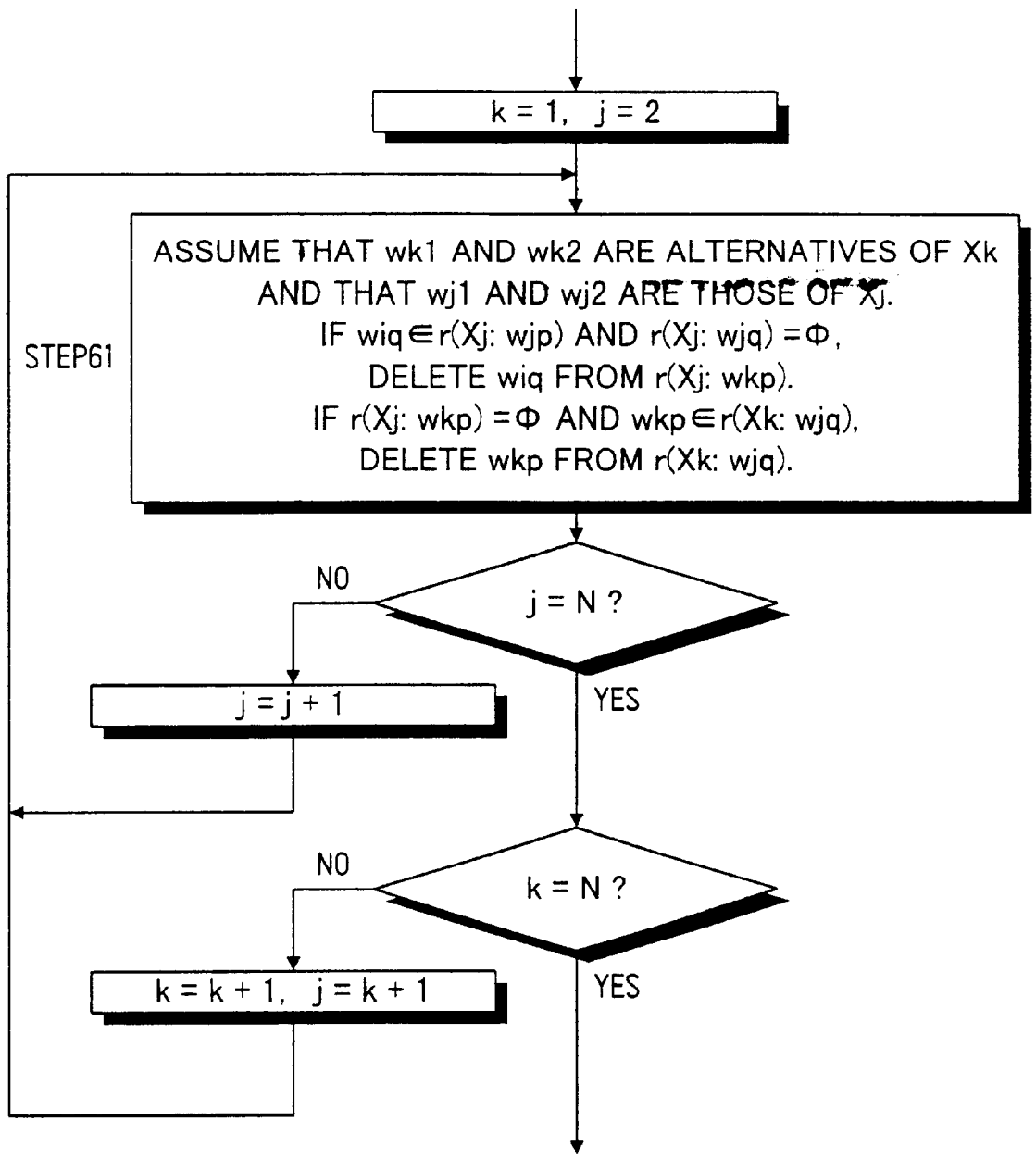
FIG. 6 is a flowchart showing a procedure for completing a reachable value set used in the embodiment of the present invention.

The value completion module 17 completes the reachable value set obtained by set calculation module 16. FIG. 6 is a flowchart showing the procedure for completing the value set. Symbols j and k are used as control variables in this procedure. In step 61, for parts Xk and Xj, if reachable value set r(Xj: wkp), which is a set of alternatives of part Xj including only alternatives reachable from alternative wkp of part Xk, includes alternative wjq, and if reachable value set r(Xj: wjq) is empty, the module 17 deletes alternative wjq from the reachable value set r(Xj: wkp).

(2-4-3) Calculating a Solution from Completed Reachable Value Set

Figure 7:
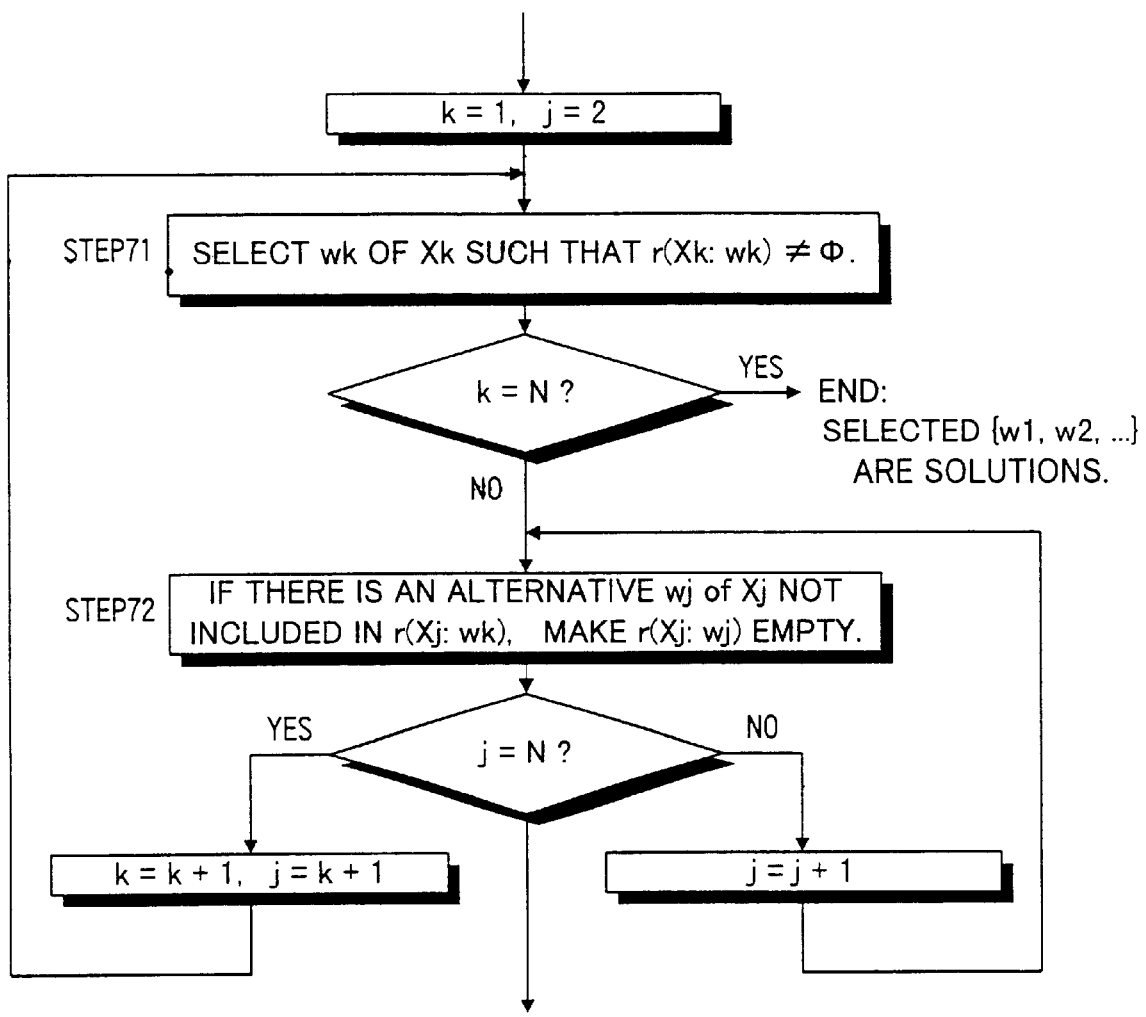
FIG. 7 is a flowchart showing a procedure for calculating a solution from completed reachable value set used in the embodiment of the present invention.

The solution generating module 18 calculates a solution from the reachable value set completed by value completion module 17. FIG. 7 is a flowchart showing a procedure for calculating a solution. In step 71, module 18 selects one alternative wk of part Xk such that reachable value set r(Xk: wk) is not empty, beginning with k=1. If k=N, the module ends the processing because a set of alternatives w1, . . . , wN of selected parts X1, . . . , XN is a solution. If k<N and there is an alternative wj of part Xj, which is not included in reachable value set r(Xj: wk), the module deletes wj from reachable value set r(Xj: wj) in step 72 in order to delete an alternative of part Xj (j>k) inconsistent with alternative wk of part Xk.

It is evident that an assignment (solution) of alternatives consistent for all the parts is determined according to the procedures shown in FIGS. 4 to 7. This is because, when each part Xk has only two alternatives, the necessary and sufficient conditions for assigning consistently alternatives for the whole system are that each part has alternative wk, that reachable value set r(Xj: wk) is not empty for all parts Xj, and that, if reachable value set r(Xj: wk) includes alternative wj, reachable value set r(Xj: wj) is not empty.

(2-4-4) Outputting of Solutions

When the subset generating module 1 has received information indicating the existence of solutions from solution calculation module 2, and the number of solutions is equal to the number stored in pattern storage module 8, or when module 1 ends the processing for all subsets V1(j1), V2(j2), . . . , VN(jN), module 1 sends a solution output command to solution output module 10 through a path 13. In response to receiving of this output command, module 10 sends a command for calculating solutions from a calculated reachable value set, to solution calculation module 2 through path 6. The solution generating module 18 (FIG. 3) in module 2 receives this command, calculates solutions from the reachable value set stored in result storage module 9, and returns the solutions to module 10 through path 6. The solution output module 10 receives final solutions and outputs each of them in a form acceptable to the corresponding application. At this time, the module 10 outputs m solutions if m solutions are requested by the command stored in module 8, otherwise, module 10 outputs all solutions.

(3) Example 1

Figure 8:
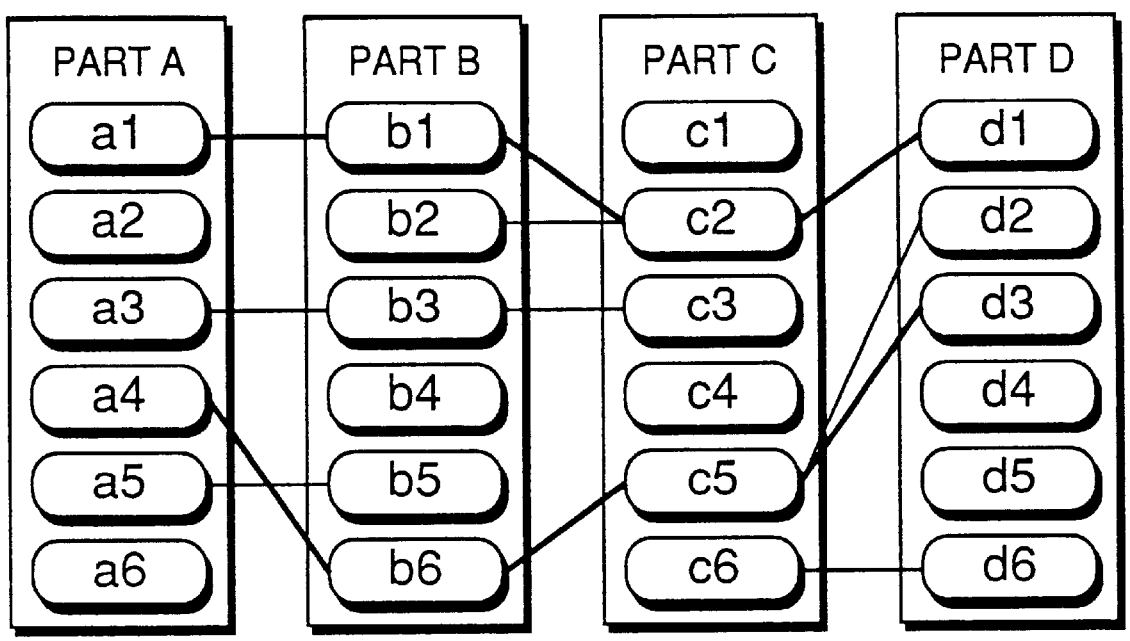
FIG. 8 is a diagram showing the configuration of an exemplary problem presented in the embodiment of the present invention.

The following explains how an exemplary problem are solved according to the above procedures. In this example, the problem includes parts A, B, C, and D, each part having six alternatives a1–a6, b1–b6, c1–c6, and d1–d6, as shown in FIG. 8. There are constraints between each two parts of four pairs, (A, B), (B, C), (C, D), (D, A). In FIG. 8, permissible combinations between each two parts of part pairs, except that between parts D and A, are connected by lines. In addition to combinations shown in this figure, alternative a1 may be combined with only d1 or d2, and alternative a4 may be combined with only d3.

That is, assume that parts of the problem and alternatives for the parts are as follows:

Part A: Alternatives a1, a2, a3, a4, a5, a6
Part B: Alternatives b1, b2, b3, b4, b5, b6
Part C: Alternatives c1, c2, c3, c4, c5, c6
Part D: Alternatives d1, d2, d3, d4, d5, d6 and that permissible combinations of alternatives are as follows:

Parts A and B: (a1:b1), (a3:b3), (a4:b6), (a5:b5)
Parts A and D: (a1:d1/d2), (a4:d3)
Parts B and C: (b1:c2), (b2:c2), (b3:c3), (b6:c5)
Parts C and D: (c2:d1), (c5:d2/d3), (c6:d6)

For this problem, there are two solutions {a1, b1, c2, d1} and {a4, b6, c5, d3}. In FIG. 8, the combinations of alternatives that are the solutions of the problem are connected by bold solid lines. The following shows how solutions are found for this exemplary problem using the procedure of the embodiment described above.

(3-1) Processing by Subset Generating Module

Figure 9:
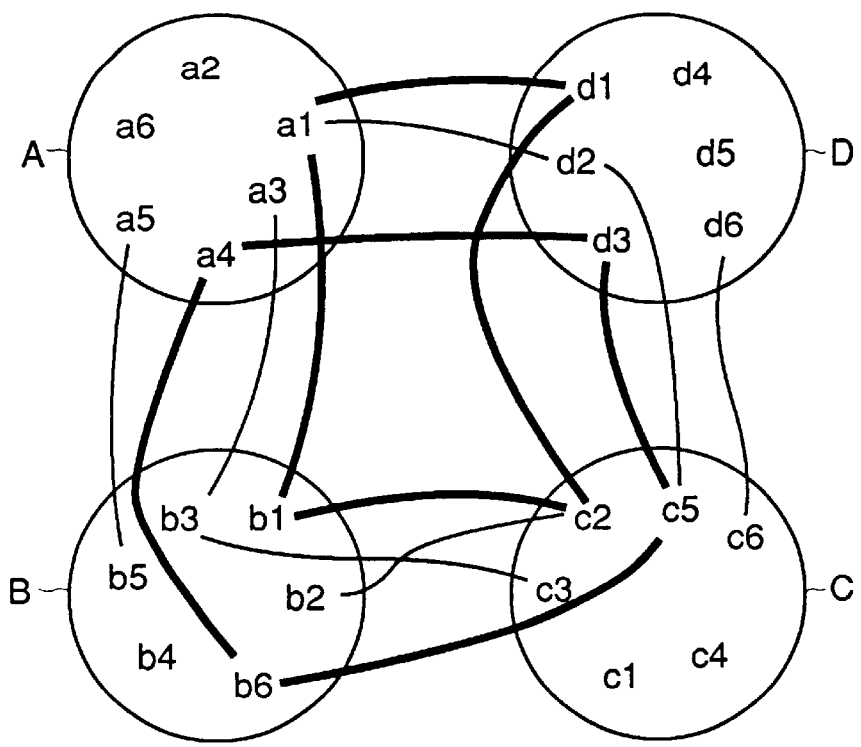
FIG. 9 is a diagram showing the details of the exemplary problem of FIG. 8.

First, the following data is entered into subset generating module 1 (see FIG. 9):

Part A, part B, part C, part D:
   (a1, a2, a3, a4, a5, a6)
   (b1, b2, b3, b4, b5, b6)
   (c1, c2, c3, c4, c5, c6)
   (d1, d2, d3, d4, d5, d6)
   (part A, part B)=(a1, b1), (a3, b3), (a4, a6), (a5, b5)/
   (part A, part D)=(a1, d1), (a1, d2), (a4, d3)/
   (part B, part C)=(b1, c2), (b2, c2), (b3, c3), (b6, c5)/
   (part C, part D)=(c2, d1), (c5, d2), (c5, d3), (c6, d6)/

Then, the subset generating module 1 divides the set of alternatives permissible for four parts A–D into a plurality of subsets such that each subset has not more than two alternatives for each part, and sequentially sends the subsets to solution calculation module 2. Concretely, the following subset data (i), (ii), (iii), (iv), (v), . . . , (P), . . . , (Q) are generated and sequentially sent.

Figure 10:
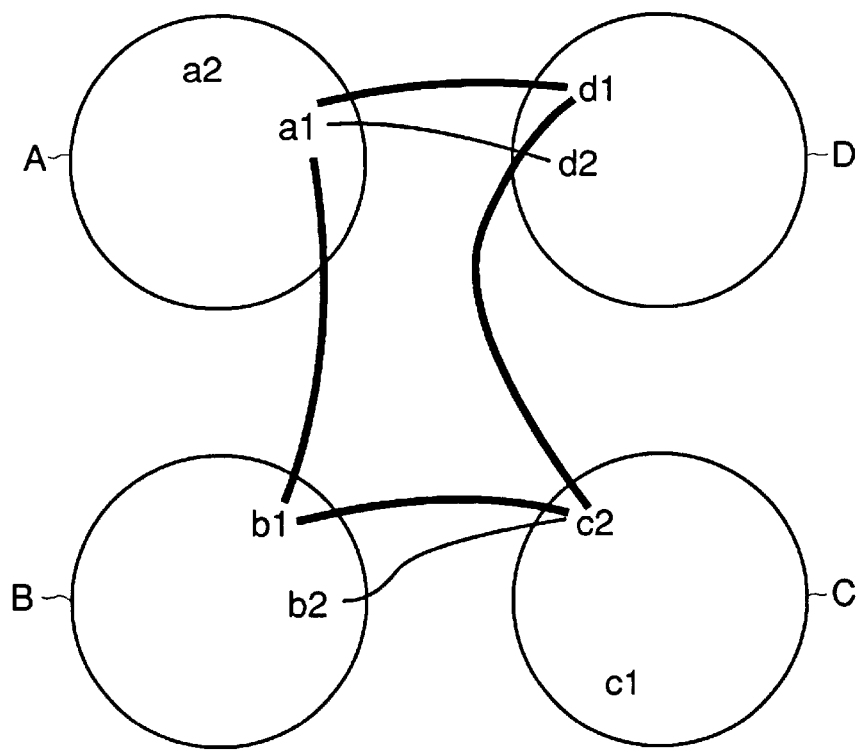
FIGS. 10, 11, 12, 13, 14, 15 and 16 are diagrams showing respectively the details of subsets (i), (ii), (iii), (iv), (v), (P) and (Q) created by dividing the exemplary problem presented in the embodiment of the present invention.

(i) Part A, part B, part C, part D:
   (a1, a2), (b1, b2), (c1, c2), (d1, d2):
     (part A, part B)=(a1, b1)/
     (part A, part D)=(a1, d1), (a1, d2)/
     (part B, part C)=(b1, c2), (b2, c2)/
     (part C, part D)=(c2, d1)/
     (FIG. 10)

Figure 11:
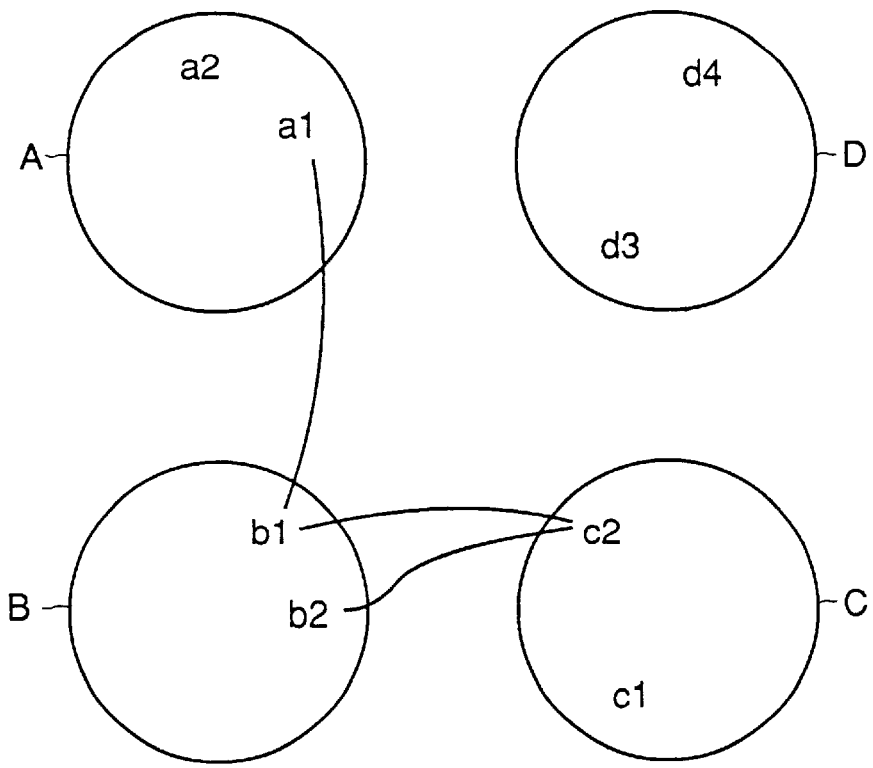

(ii) Part A, part B, part C, part D:
   (a1, a2), (b1, b2), (c1, c2), (d3, d4):
     (part A, part B)=(a1, b1)/
     (part A, part D)=nothing/
     (part B, part C)=(b1, c2), (b2, c2)/
     (part C, part D)=nothing/
     (FIG. 11)

Figure 12:
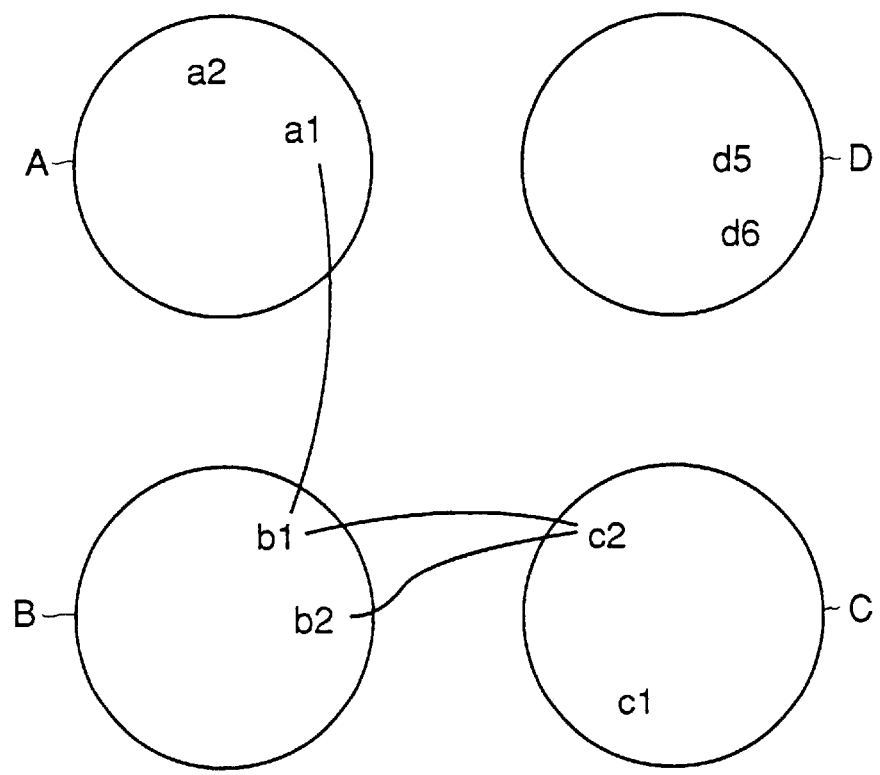

(iii) Part A, part B, part C, part D:
   (a1, a2), (b1, b2), (c1, c2), (d5, d6):
     (part A, part B)=(a1, b1)/
     (part A, part D)=nothing/
     (part B, part C)=(b1, c2), (b2, c2)/
     (part C, part D)=nothing/
     (FIG. 12)

Figure 13:
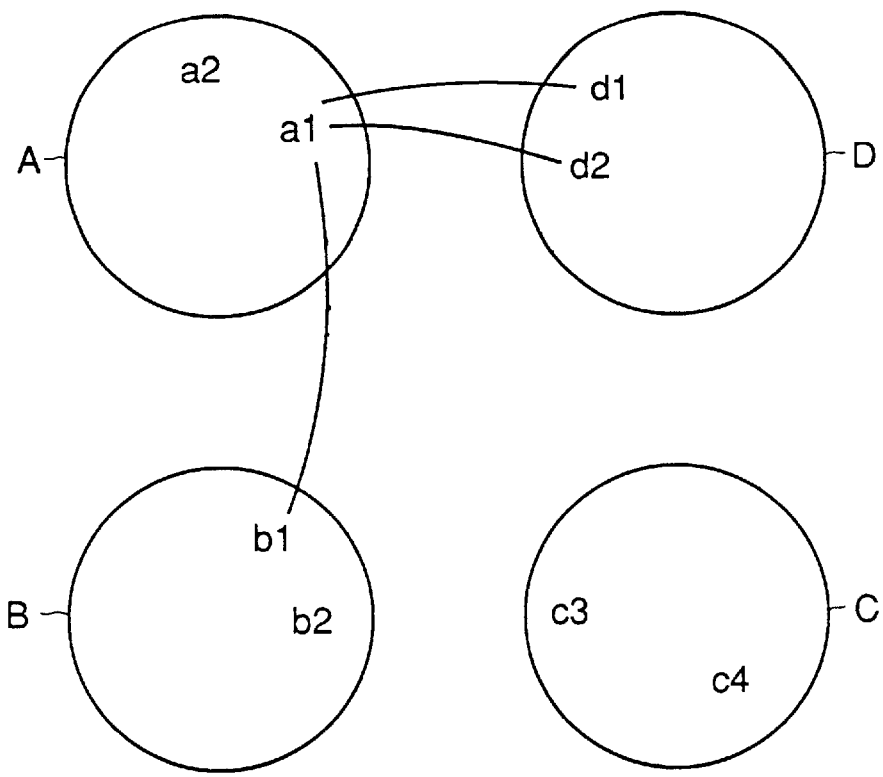

(iv) Part A, part B, part C, part D:
   (a1, a2), (b1, b2), (c3, c4), (d1, d2):
     (part A, part B)=(a1, b1)/
     (part A, part D)=(a1, d1), (a1, d2)/
     (part B, part C)=nothing/
     (part C, part D)=nothing/
     (FIG. 13)

Figure 14:
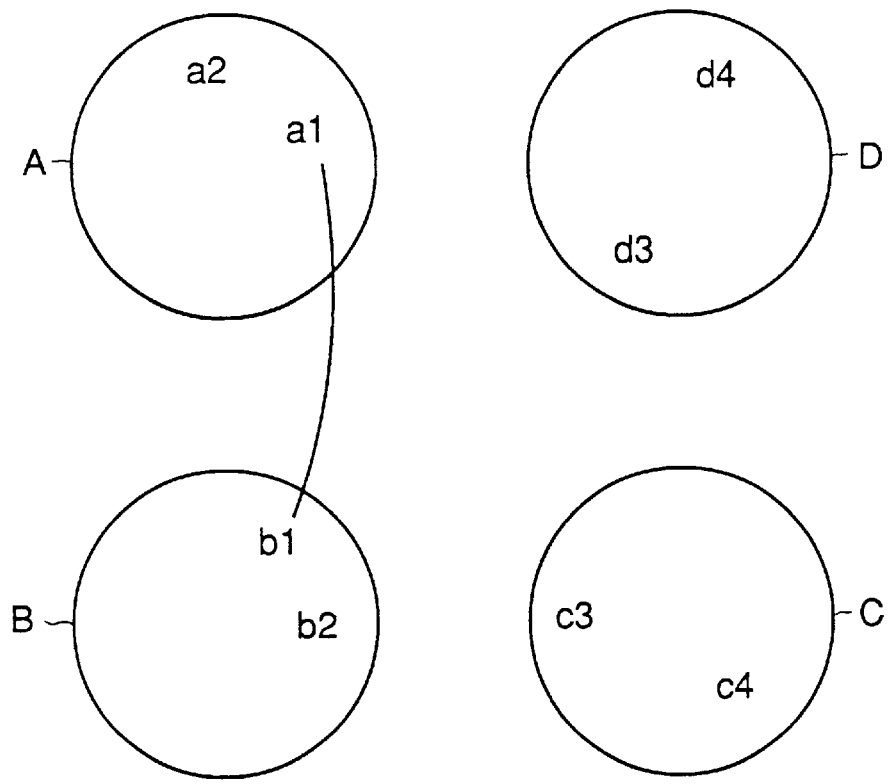

(v) Part A, part B, part C, part D:
   (a1, a2), (b1, b2), (c3, c4), (d3, d4):
     (part A, part B)=(a1, b1)/
     (part A, part D)=nothing/
     (part B, part C)=nothing/
     (part C, part D)=nothing/
     (FIG. 14)
. . .
. . .

Figure 15:
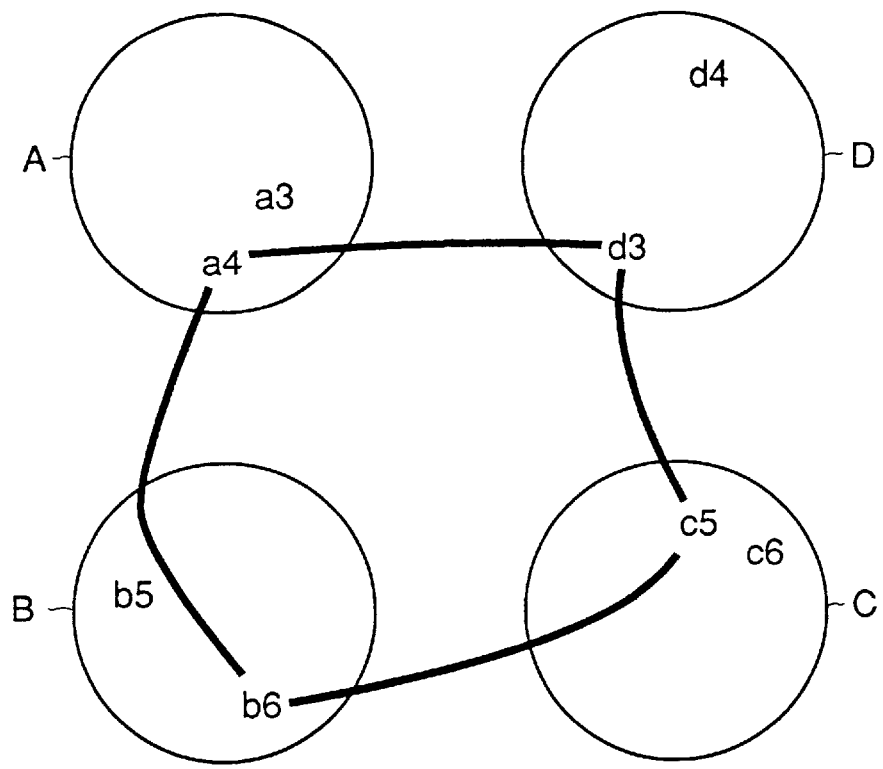

(P) Part A, part B, part C, part D:
   (a3, a4), (b5, b6), (c5, c6), (d3, d4):
     (part A, part B)=(a4, b6)/
     (part A, part D)=(a4, d3)/
     (part B, part C)=(b6, c5)/
     (part C, part D)=(c5, d3)/
     (FIG. 15)
. . .

Figure 16:
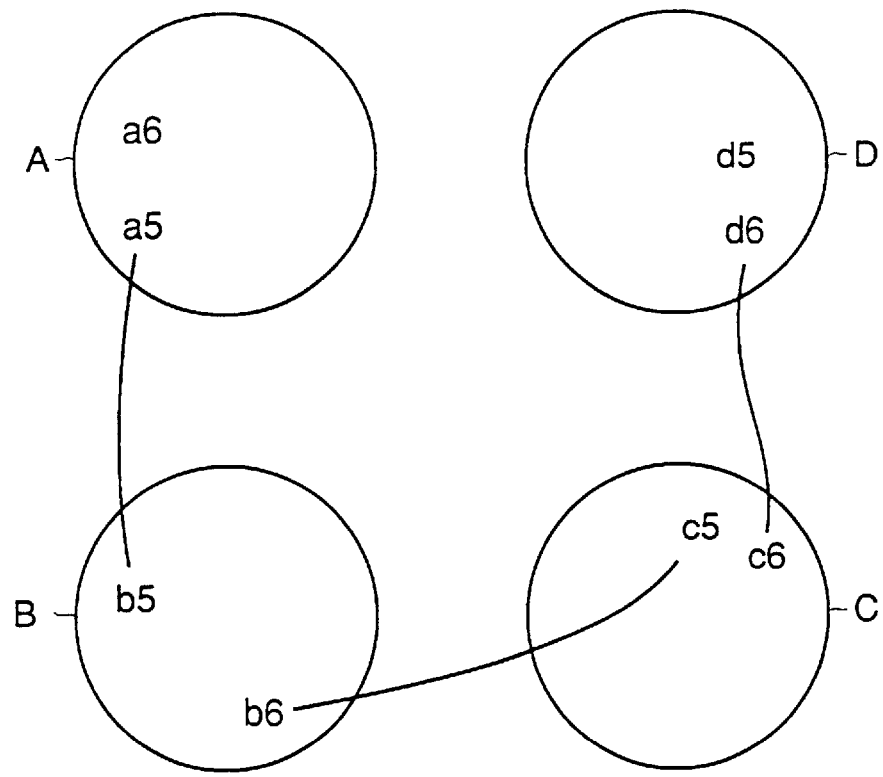

(Q) Part A, part B, part C, part D:
   (a5, a6), (b5, b6), (c5, c6), (d5, d6):
     (part A, part B)=(a5, b5)/
     (part A, part D)=nothing/
     (part B, part C)=(b6, c5)/
     (part C, part D)=(c6, d6)/
     (FIG. 16)

(3-2) Processing by Solution Calculation Module

The solution calculation module 2 receives the first input data (i) (FIG. 10), as shown below, from subset generating module 1.

(i) Part A, part B, part C, part D:
   (a1, a2), (b1, b2), (c1, c2), (d1, d2)
   (part A, part B)=(a1, b1)/
   (part A, part D)=(a1, d1), (a1, d2)/
   (part B, part C)=(b1, c2), (b2, c2)/
   (part C, part D)=(c2, d1)/

The module calculates a reachable value set of each alternative for its own part according to the procedures shown in FIGS. 4 and 5.

Figure 17:
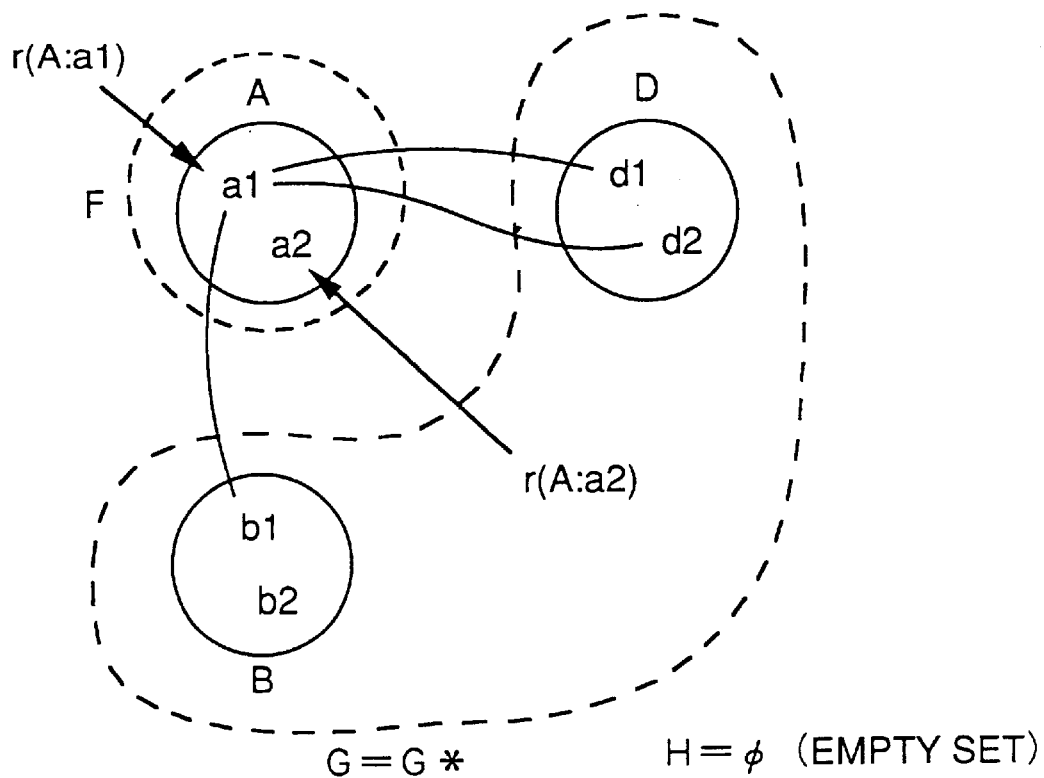
FIGS. 17, 18, 19, 20, 21, 22, 23, and 24 are diagrams showing the details of sets calculated from the subset (i) of FIG. 10 during a process for finding a solution from the subsets.
Figure 18:
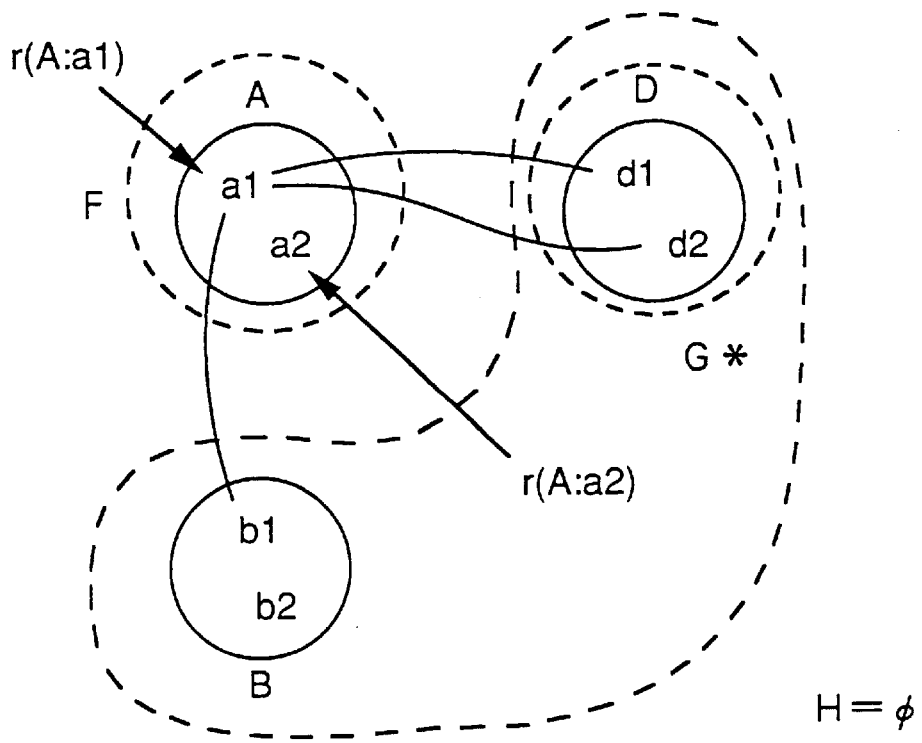

In step 41, for alternatives a1 and a2 of A, reachable value sets r(A: a1)=a1 and r(A: a2)=a2. Since calculated set F={A} and parts B and D are adjacent to part A, uncalculated set G=uncalculated set G*={B, D} (FIG. 17). Then, in step 42, part B is retrieved from uncalculated set G*, resulting in G*={D}. Since alternatives a1 and b1 are connectable to each other, reachable value set r(B: a1)={b1} (means that b1 is an alternative which of part B is connectable to alternative a1). On the other hand, since any alternative of part B is not connectable to alternative a2, reachable value set r(B: a2) is empty (FIG. 18). As shown in FIG. 18, alternative b2 is not connectable to any alternative of part A.

Figure 19:
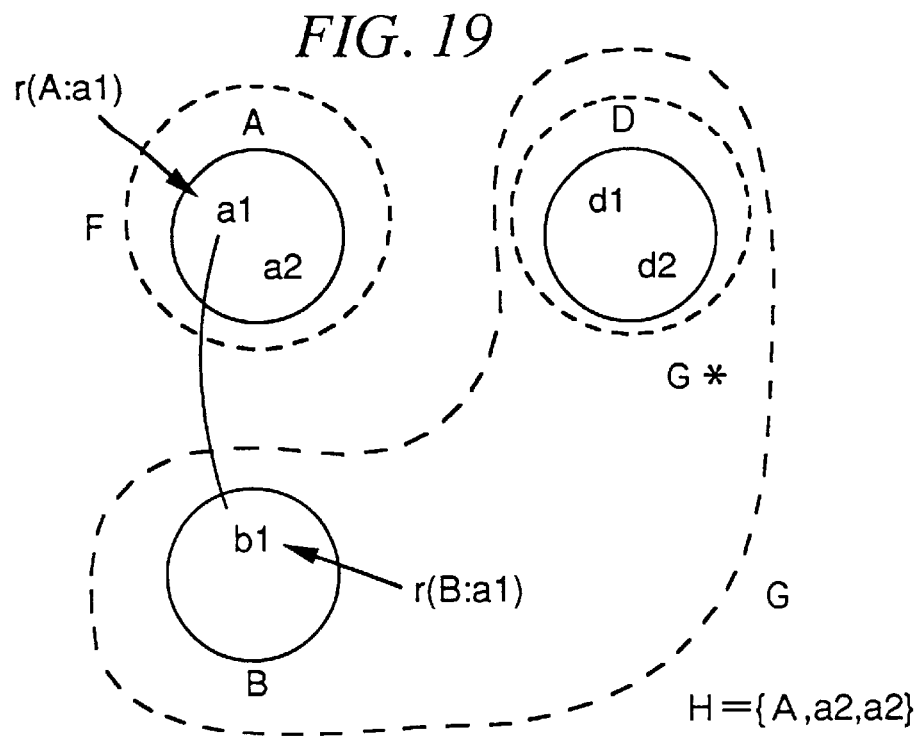

In step 44, since element a2 of reachable value set r(A: a2) is not connectable to any element in reachable value set r(B: a2), alternative a2 is deleted from reachable value set r(A: a2) and the set becomes empty. Deletion information {A: a2, a2} is added to deletion set H (FIG. 19). As shown in FIG. 19, alternative a2 is not connectable to any alternative of part B.

Figure 20:
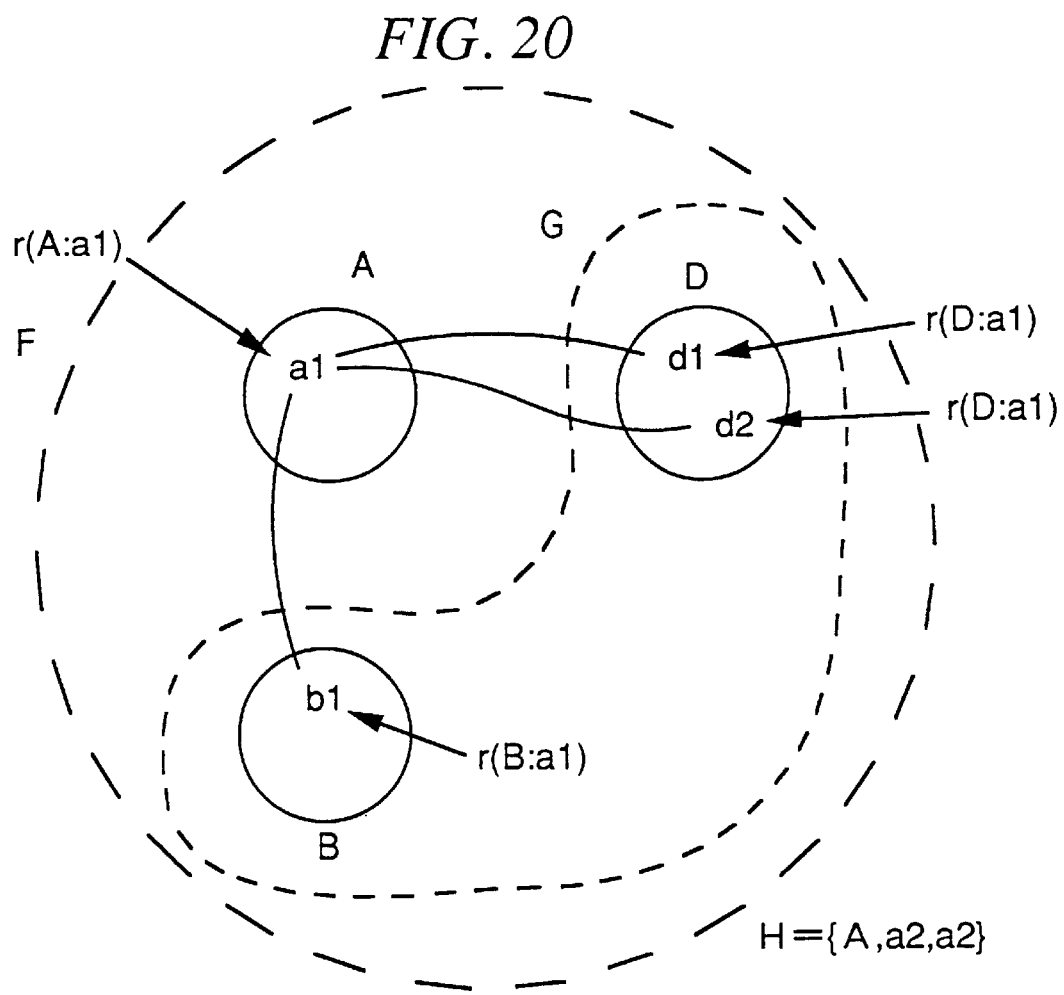
Figure 21:
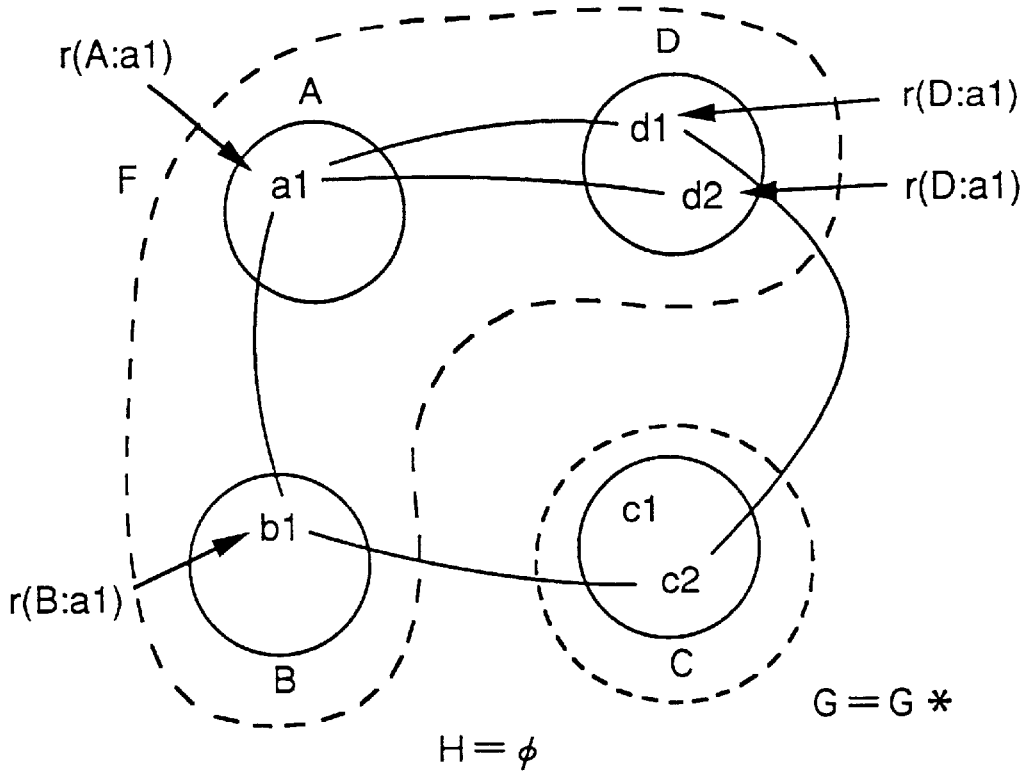

Here, part B is added to calculated set F, resulting in that calculated set F={A, B}. Since uncalculated set G* is not empty, the operation returns to step 42, part D is retrieved from uncalculated set G*. This results in that uncalculated set G* becomes empty. Part D has alternatives d1 and d2, which are connectable to alternative a1 (there is no constraint between parts B and D). Therefore, reachable value set r(D: a1)={d1, d2}, and calculated set F={A, B, D} (FIG. 20). Since uncalculated set G* is empty and deletion set H contains deletion information {A: a2, a2}, the operation goes to step 46. At this point, since reachable value set r(A: a2) is already empty, any more action is not carried out in steps 46–48 and the operation goes to step 49. In this step, uncalculated set G={C} is calculated as a part, which is adjacent to uncalculated set G={B, D}, not included in calculated set F. Uncalculated set G*=uncalculated set G, and the operation goes back to step 42 (FIG. 21).

In step 42, part C is retrieved from uncalculated set G*={C} to make uncalculated set G* an empty set. In addition, since alternative c2 is connectable to b1 and c2 is connectable to d1, reachable value set r(C: a1)={c2} (FIG.

Figure 22:
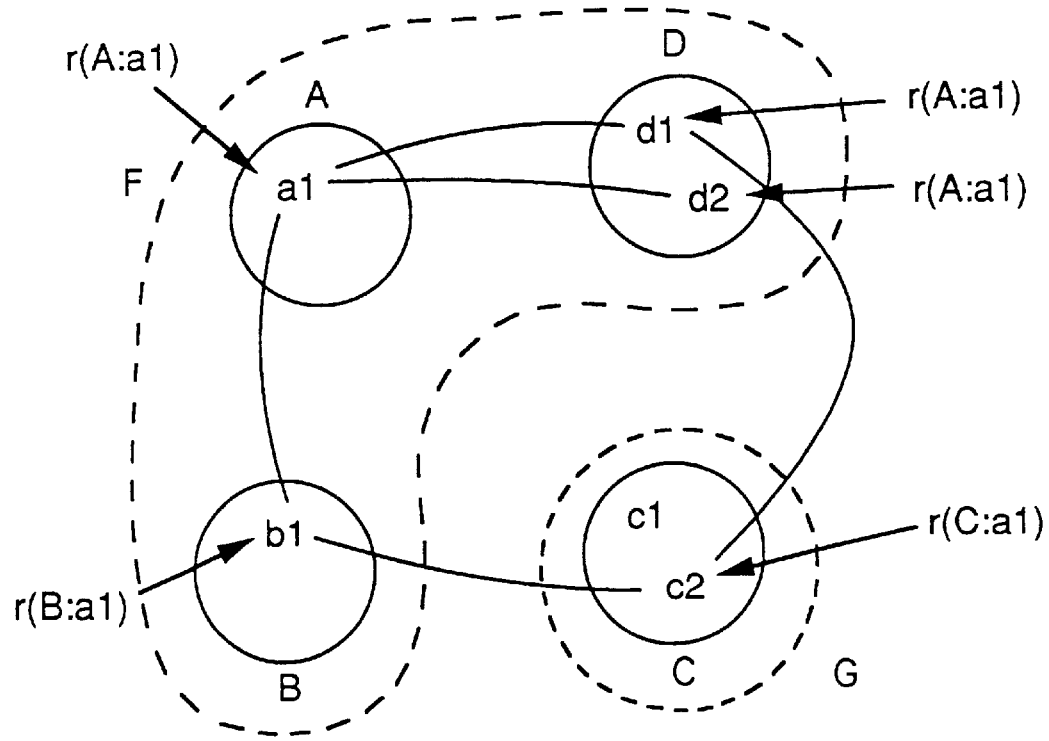
Figure 23:
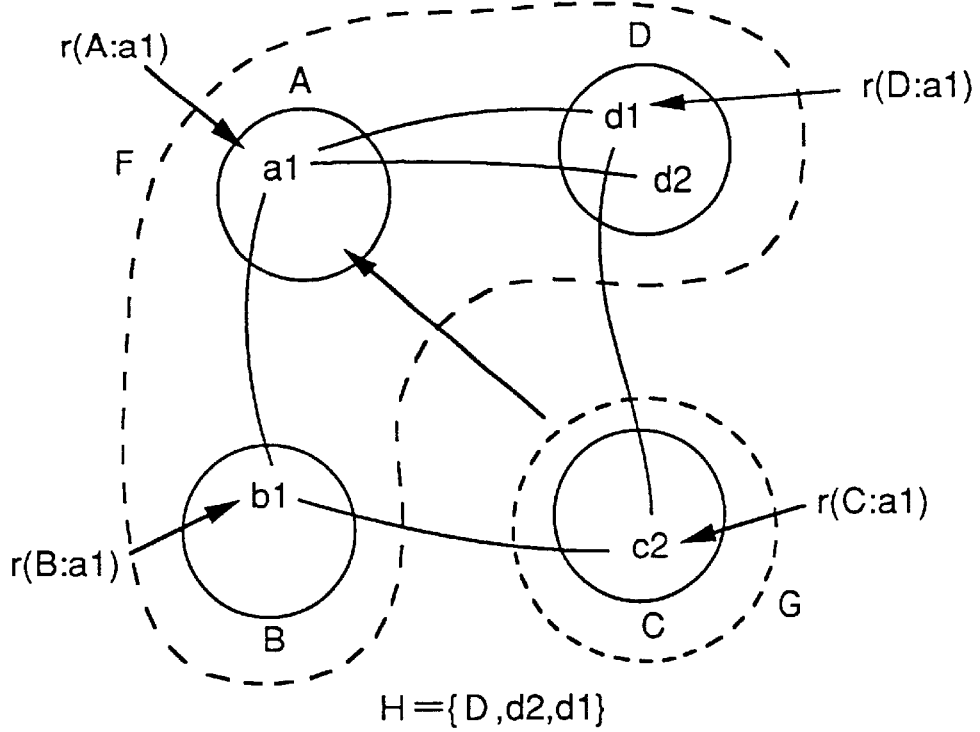

22). However, any element of reachable value set r(C: a1) is not connectable to alternative d2, therefore, d2 is deleted from reachable value set r(D: a1)={d1, d2} in step 44, and {D: d2, a1} is added to deletion set H (FIG. 23). As shown in FIG. 22, alternative c1 is not connectable to any alternative of part D. Similarly, as shown in FIG. 23, alternative d2 is not connectable to any alternative of part C.

Figure 24:
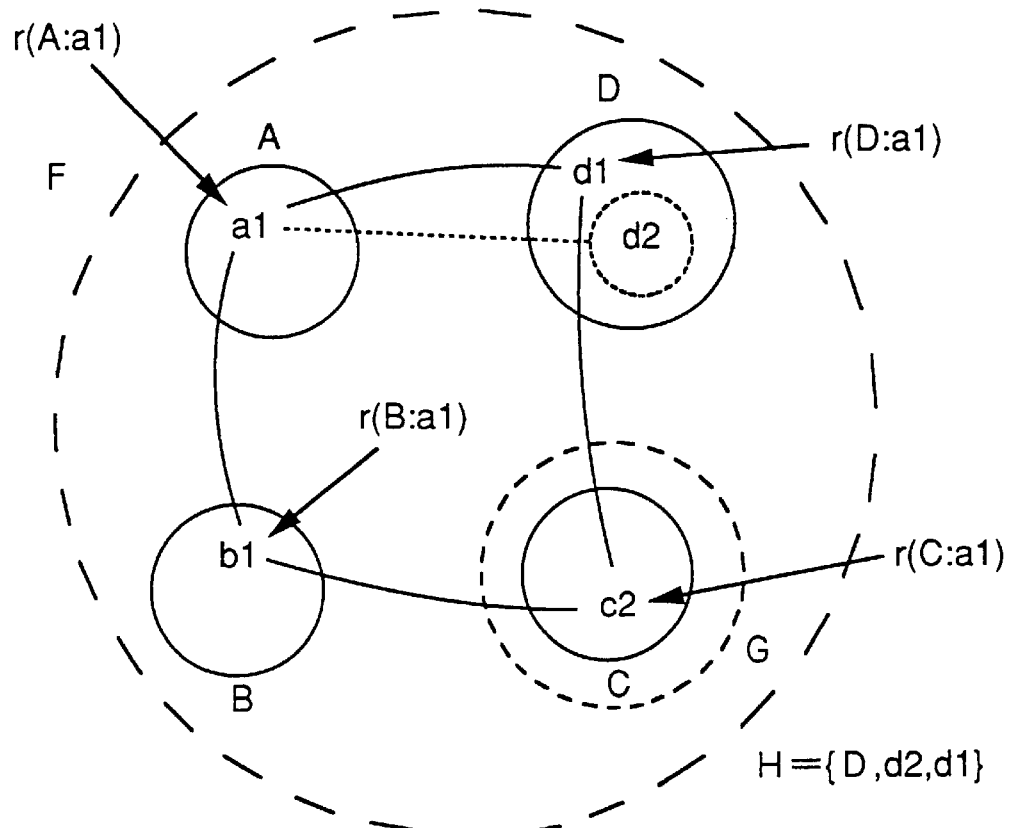

Since any element in reachable value sets r(B: a1) and r(D: a1) is not connectable to alternative c1, the alternative is not included in reachable value set r(C: a1) (FIG. 22). Next, part C is added to calculated set F, resulting in calculated set F={A, B, C, D}. The operation goes to step 46 since deletion set H contains {D: d2, a1}. For parts A and C, which are adjacent to part D, both of element a1 of reachable value set r(A: a1) and element c2 of reachable value set r(C: a1) are connectable to element d1, which is not d2, of reachable value set r(D: a1). Therefore, any more action is not carried out in steps 46–48 and the operation goes to step 49 (FIG. 24). As shown in FIG. 24, alternative a1 is connectable not only to alternative d2 but also to alternative d1. This is because of that no more action is carried out even if alternative d2 is deleted.

At this point, all elements belong to calculated set F and therefore uncalculated set G is empty. Then, reachable value sets are calculated for alternatives b1 and b2 of part B. This calculation also is carried out for parts C and D. The result is as shown below.

r(A: a1)={a1}, r(A: a2)=empty,
r(B: a1)={b1}, r(B: a2)=empty,
r(C: a1)={c2}, r(C: a2)=empty,
r(D: a1)={d1}, r(D: a2)=empty,
r(A: b1)={a1}, r(A: b2)=empty,
r(B: b1)={b1}, r(B: b2)=empty,
r(C: b1)={c2}, r(C: b2)=empty,
r(D: b1)={d1}, r(D: b2)=empty,
r(A: c1)=empty, r(A: c2)={a1},
r(B: c1)=empty, r(B: c2)={b1},
r(C: c1)=empty, r(C: c2)={c2},
r(D: c1)=empty, r(D: c2)={d1},
r(A: d1)={a1}, r(A: b2)=empty,
r(B: d1)={b1}, r(B: d2)=empty,
r(C: d1)={c2}, r(C: d2)=empty,
r(D: d1)={d1}, r(D: d2)=empty.

In the procedure shown in FIG. 6 where a reachable value set is completed, if reachable value set r(P: q) contains p and reachable value set r(P: p) is empty, then p is deleted from r(P: q). However, in this example, no such situation occurs and therefore no more action is carried out. In the procedure for calculating a solution shown in FIG. 7, alternative a1 is selected in step 71 because reachable value set r(A: a1)={a1}. In step 72, the reachable value sets with respect to elements b2, c1, and d2 of parts B, C, and D, which are respectively not included in reachable value sets r(B: a1), r(C: a1), and r(D: a1), are empty. Thus, no more action is carried out and the operation returns to step 72. This time, since reachable value set r(B: b1)={b1}, b1 is selected as an alternative of B. Similarly, c2 and d1 are selected and, finally, a solution {a1, b1, c2, d1} is found.

The same operation is carried out on all subset data following (i). All the reachable value sets of the all subset data except (P) are found to be empty since no solution is found for them. From subset data (P), a solution {a4, b6, c5, d3} is found.

(4) Example 2

The following shows an exemplary problem in which, unless an alternative set is divided, a reachable value set does not become empty even if there is no solution.

(4-1) Processing by Subset Generating Module

Assume that parts of the problem and alternative for the parts are as follows:

Part A: Alternatives a1, a2, a3
Part B: Alternatives b1, b2, b3
Part C: Alternatives c1, c2, c3
Part D: Alternatives d1, d2, d3 and that permissible combinations of alternatives are as follows:

Parts A and B: (a1: b2/b3), (a2: b1/b3), (a3, b1/b2)
Parts A and C: (a1: c2/c3), (a2: c1/c3), (a3, c1/c2)
Parts A and D: (a1: d2/d3), (a2: d1/d3), (a3, d1/d2)
Parts B and C: (b1: c2/c3), (b2: c1/c3), (b3, c1/c2)
Parts B and D: (b1: d2/d3), (b2: d1/d3), (b3, d1/d2)
Parts C and D: (c1: d2/d3), (c2: d1/d3), (c3, d1/d2)

For this problem, the following data is entered into subset generating module 1 (see FIG. 25):

Part A, part B, part C, part D:
(a1, a2, a3), (b1, b2, b3), (c1, c2, c3), (d1, d2, d3):
(part A, part B)=(a1, b2), (a1, b3), (a2, b1), (a2, b3), (a3, b1), (a3, b2)/
(part A, part C)=(a1, c2), (a1, c3), (a2, c1), (a2, c3), (a3, c1), (a3, c2)/
(part A, part D)=(a1, d2), (a1, d3), (a2, d1), (a2, d3), (a3, d1), (a3, d2)/
(part B, part C)=(b1, c2), (b1, c3), (b2, c1), (b2, c3), (b3, c1), (b3, c2)/
(part B, part D)=(b1, d2), (b1, d3), (b2, d1), (b2, d3), (b3, d1), (b3, d2)/
(part C, part D)=(c1, d2), (c1, d3), (c2, d1), (c2, d3), (c3, d1), (c3, d2)/

Then, the subset generating module 1 divides the alternative set permissible for four parts A–D into a plurality of subsets such that each subset has not more than two alternatives for each part, and sequentially sends the subsets to solution calculation module 2. Concretely, the following subset data (i), (ii), (iii), (iv), (v), (vi), . . . , (A) are generated and sequentially sent.

Figure 27:
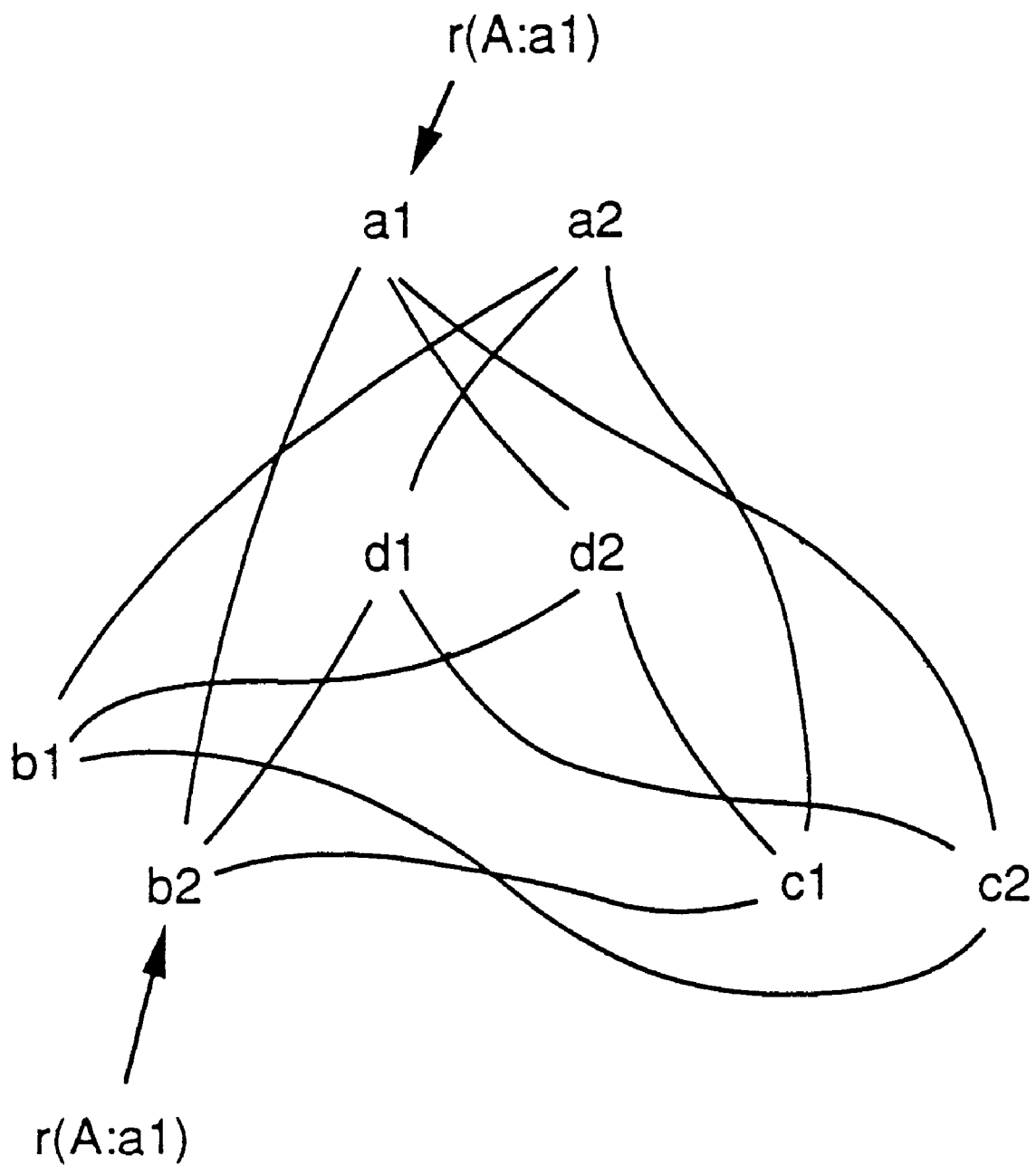

(i) Part A, part B, part C, part D:
(a1, a2), (b1, b2), (c1, c2), (d1, d2):
(part A, part B)=(a1, b2), (a2, b1)/
(part A, part C)=(a1, c2), (a2, c1)/
(part A, part D)=(a1, d2), (a2, d1)/
(part B, part C)=(b1, c2), (b2, c1)/
(part B, part D)=(b1, d2), (b2, d1)/
(part C, part D)=(c1, d2), (c2, d1)/
(FIG. 27)

(ii) Part A, part B, part C, part D:
(a1, a2), (b1, b2), (c1, c2), (d3):
(part A, part B)=(a1, b2), (a2, b1)/
(part A, part C)=(a1, c2), (a2, c1)/
(part A, part D)=(a1, d3), (a2, d3)/
(part B, part C)=(b1, c2), (b2, c1)/
(part B, part D)=(b1, d3), (b2, d3)/
(part C, part D)=(c1, d3), (c2, d3)/

(iii) Part A, part B, part C, part D:
(a1, a2), (b1, b2), (c3), (d1, d2):
(part A, part B)=(a1, b2), (a2, b1)/
(part A, part C)=(a1, c3), (a2, c3)/
(part A, part D)=(a1, d2), (a2, d1)/
(part B, part C)=(b1, c3), (b2, c3)/
(part B, part D)=(b1, d2), (b2, d1)/
(part C, part D)=(c1, d3), (c2, d3)/

(iv) Part A, part B, part C, part D:
(a1, a2), (b3), (c1, c2), (d1, d2):

(part A, part B)=(a1, b3), (a2, b3)/
(part A, part C)=(a1, c2), (a2, c1)/
(part A, part D)=(a1, d2), (a2, d1)/
(part B, part C)=(b3, c2), (b3, c1)/
(part B, part D)=(b3, d2), (b3, d1)/
(part C, part D)=(c1, d2), (c2, d1)/
(v) Part A, part B, part C, part D:
  (a3), (b1, b2), (c1, c2), (d1, d2):
    (part A, part B)=(a3, b1), (a3, b2)/
    (part A, part C)=(a3, c1), (a3, c2)/
    (part A, part D)=(a3, d1), (a3, d2)/
    (part B, part C)=(b1, c2), (b2, c1)/
    (part B, part D)=(b1, d2), (b2, d1)/
    (part C, part D)=(c1, d2), (c2, d1)/
(vi) Part A, part B, part C, part D:
  (a1, a2), (b1, b2), (c3), (d3):
    (part A, part B)=(a1, b2), (a2, b1)/
    (part A, part C)=(a1, c3), (a2, c3)/
    (part A, part D)=(a1, d3), (a2, d3)/
    (part B, part C)=(b1, c3), (b2, c3)/
    (part B, part D)=(b1, d3), (b2, d3)/
    (part C, part D)=(c3, d3)/
. . .
(A) Part A, part B, part C, part D:
  (a3), (b3), (c3), (d3):
    (part A, part B)=nothing/
    (part A, part C)=nothing/
    (part A, part D)=nothing/
    (part B, part C)=nothing/
    (part B, part D)=nothing/
    (part C, part D)=nothing/

(4-2) Processing by Solution Calculation Module

Assume that the first input data (i) is sent from subset generating module 1 to solution calculation module 2.

(i) Part A, part B, part C, part D:
  (a1, a2), (b1, b2), (c1, c2), (d1, d2):
    (part A, part B)=(a1, b2), (a2, b1)/
    (part A, part C)=(a1, c2), (a2, c1)/
    (part A, part D)=(a1, d2), (a2, d1)/
    (part B, part C)=(b1, c2), (b2, c1)/
    (part B, part D)=(b1, d2), (b2, d1)/
    (part C, part D)=(c1, d2), (c2, d1)/

According to the procedure shown in FIG. 4, the module first calculates a reachable value set of each part for its own alternative. For example, in step 41, a reachable value set of part A for its own alternative a1 is r(A: a1)=a1. In steps 42 to 45, initially, calculated set F is F={A} and uncalculated set G* is G*={B, C, D} because B, C, and D are adjacent to part A. Then, part B is retrieved from uncalculated set G*, resulting in reachable value set r(B: a1)={b2}. Following this, part C is retrieved from uncalculated set G*, resulting in reachable value set r(C: a1) becomes empty because alternatives c1 and c2 of part C are inconsistent with either reachable value set r(A: a1)={a1} or r(B: a1)={b2}. Similarly, reachable value set r(C: a2) becomes empty and therefore the processing for (i) ends before a solution is found (FIG. 27). As shown in FIG. 27, alternative c1 is not connectable to any alternative of reachable value set r(A: a1) and alternative c2 is not connectable to any alternative of reachable value set r(B: a1).

In this example, also for subset data (ii) and the remaining data, the processing ends before a solution is found, resulting in that no solution is found for the original problem given to subset generating module 1. This means that the processing has been carried out successfully since the original problem has no solution in this example.

On the contrary, assume that the original alternative set is sent to solution calculation module 2 without being divided.

Figure 25:
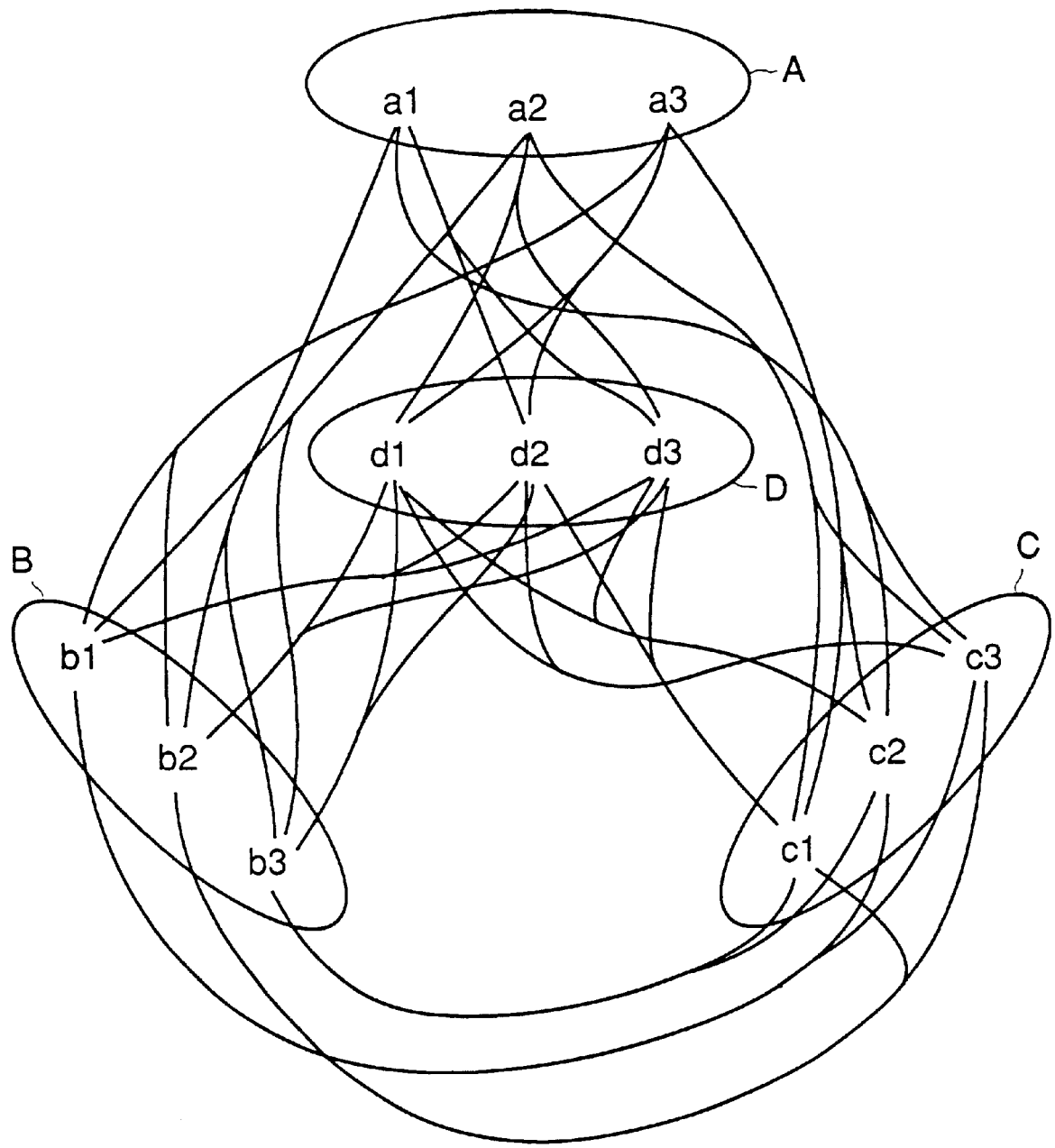
FIGS. 25, 26 and 27 are diagrams showing the details of sets in different exemplary problems used in the embodiment of the present invention.

Part A, part B, part C, part D:
  (a1, a2, a3), (b1, b2, b3), (c1, c2, c3), (d1, d2, d3):
    (part A, part B)=(a1, b2), (a1, b3), (a2, b1), (a2, b3), (a3, b1), (a3, b2)/
    (part A, part C)=(a1, c2), (a1, c3), (a2, c1), (a2, c3), (a3, c1), (a3, c2)/
    (part A, part D)=(a1, d2), (a1, d3), (a2, d1), (a2, d3), (a3, d1), (a3, d2)/
    (part B, part C)=(b1, c2), (b1, c3), (b2, c1), (b2, c3), (b3, c1), (b3, c2)/
    (part B, part D)=(b1, d2), (b1, d3), (b2, d1), (b2, d3), (b3, d1), (b3, d2)/
    (part C, part D)=(c1, d2), (c1, d3), (c2, d1), (c2, d3), (c3, d1), (c3, d2)/
(FIG. 25)

In this case, in step 41, a reachable value set of part A for its own alternative a1 is r(A:a1)=a1. In steps 42 to 45, initially, calculated set F is F={A} and uncalculated set G* is G*={B, C, D} because B, C, and D are adjacent to part A. So far, the processing is the same as that of the first example above. Then part B is retrieved from uncalculated set G*, resulting in reachable value set r(B: a1)={b2, b3}. Therefore, part C is retrieved from uncalculated set G*, resulting in reachable value set r(C: a1)={c2, c3} because c2 and c3 are consistent with a1, c2 is consistent with a1 and b3, and c3 is consistent with a1 and b2. Similarly, the following reachable value sets are obtained:

r(A: a1)=a1
r(B: a1)={b2, b3}
r(C: a1)={c2, c3}
r(D: a1)={d2, d3}
r(A: a2)=a2
r(B: a2)={b1, b3}
r(C: a2)={c1, c3}
r(D: a2)={d1, d3}
r(A: a3)=a3
r(B: a3)={b1, b2}
r(C: a3)={c1, c2}
r(D: a3)={d1, d2}
. . .

Figure 26:
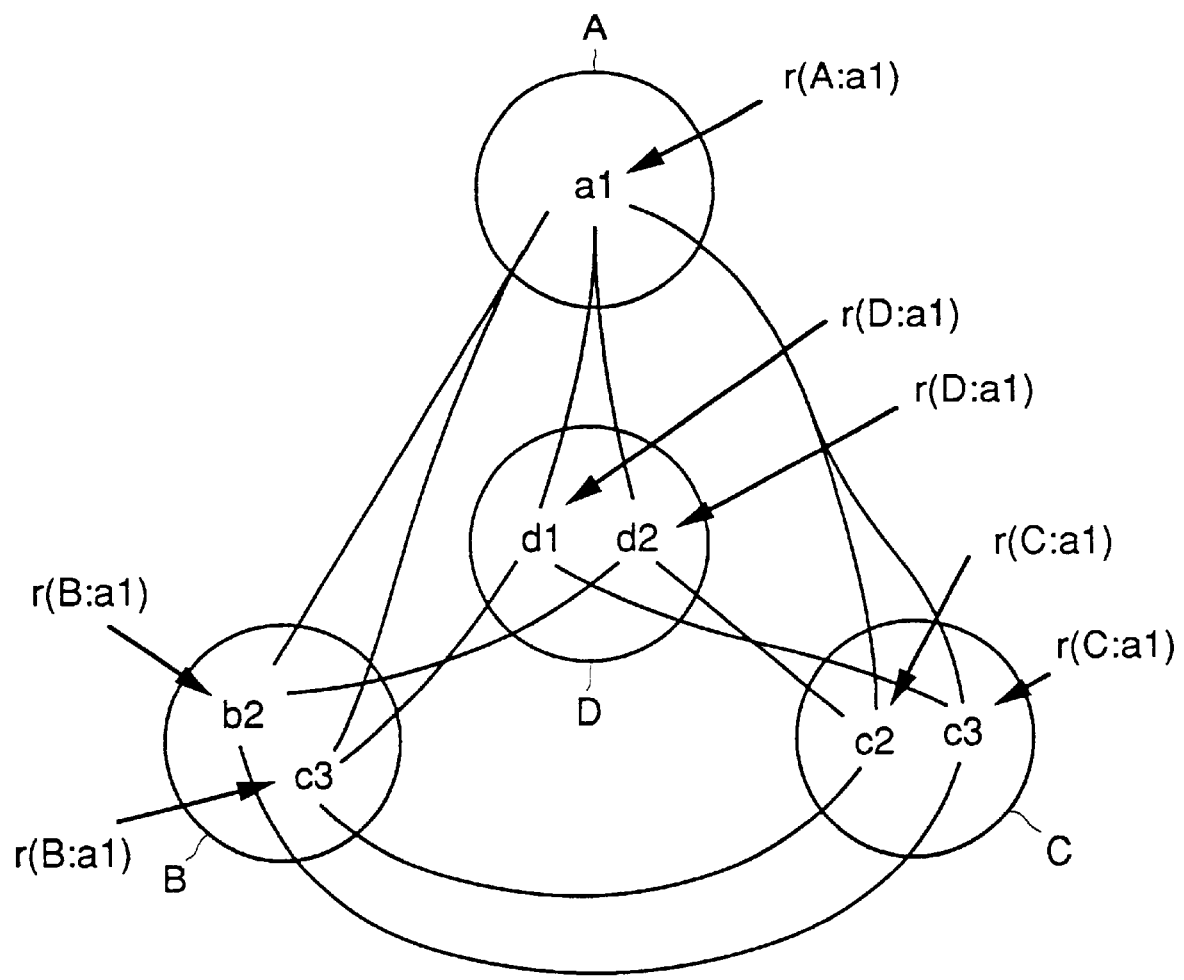

Thus, it cannot be determined by only operations so far that there is no solution. To make such a determination, various combinations must be tested by more operations (FIG. 26).

(5) Demonstration

It is demonstrated that a solution can be correctly found by the above procedure, as follows.

(5-1) Definition 1: Constraint Satisfaction Problem CSP(X, Z, V, C)

Assume that X={X1, X2, . . . } represents a set of variables, that Z is a set of pairs of variables belonging to X, and that there is a constraint on a combination of values applied for each variable pair {Xi, Xj} (∈Z). That is, only permissible pairs of values may be substituted for {Xi, Xj}. A problem which substitutes constraint-satisfying values for all variables of X is called CSP(X, Z, V, C). A combination of constraint-satisfying values is called a solution of CSP(X, Z, V, C). V={V1, V2, . . . } is a list of a set of values that may be substituted for variable Xi (i=1, 2, . . . ), and C={Ci, j} is a list of combinations of values permissible for a pair of variables {Xi, Xj} (i, j=1, 2, . . . ) of Z.

In addition, variables Xi, Xj (∈X) of CSP (X, Z, V, C) are called to be adjacent with each other if {Xi, Xj}∈Z. A set of all variables adjacent to Xi is called an adjacent set of Xi.

Assume $\{Xi, Xj\} \in Z$. If a combination of elements $\{vi, vj\}$ of $\{Vi, Vj\}$ is an element of C, then vi and vj are called to be connectable.

(5-2) Definition 2: Reachable Value Set

In CSP (X, Z, V, C), if there is a list of connectable values wi and wk of Xi and Xk, respectively, for a list of variables $\{Xi, \ldots, Xk\}$ that forms a loop, the list of connectable values is represented as follows:

$\{wi, \ldots, wk\}$ $(wj \in Vj \in V)$ then value wk of Xk is called to be reachable from value wi of Xi. A subset of Vk including all value s reachable from wi is called a reachable value set of wi for Xk and represented as $r(Xk: wi)$. Note that, if a list of variables $\{Xi, \ldots, Xk\}$ contains the same variable more than once, a value assigned to Xp, which is neither Xi nor Xk, may be different every time it appears.

(5-3) Definition 3: Complete Value Set

Assume that CSP (X, Z, V, C) is formed by $X=\{X1, X2, \ldots\}$ and $V=\{V1, V2, \ldots\}$ and that a subset of V is represented as $V=\{V1, V2, \ldots\}$ $(Vk \subset Vk)$. Also, assume that a reachable value set represented as $r(Xh: wk)$ is a reachable value set of Xh for value wk ($\in Vk$) in a CSP (X, Z, V, C).

If $Vi \neq \phi$ for all i and $wk \in Vk$, then reachable value set $r(Xj: wk) \neq \phi$ for any Xj. In addition, if $wj \in r(Xj: wk)$ and $wj \in Vj$, then the value set V is called to be complete. If V includes a complete value set V, CSP(X, Z, V, C) is called to be complete. In addition, if complete value set V of CSP(X, Z, V, C) includes all values wj, which belong to a solution $\{w1, w2, \ldots\}$ of CSP(X, Z, V, C), complete value set V is called to be the maximum complete value set of CSP (X, Z, V, C).

(5-4) Theorem 1

The necessary and sufficient condition for that CSP (X, Z, V, C), in which value set Vi of each variable Xi includes no more than two values, has a solution is that CSP (X, Z, V, C) is complete. If V is a complete value set, there is a solution of CSP (X, Z, V, C) including a value w ($\in V$).

(5-5) Demonstration

Suppose that CSP (X, Z, V, C) has a given number n of variables $\{X1, \ldots, XN\}$ and that its solution is $\{v1, \ldots, vN\}$. Then, $V=\{v1, \ldots, vN\}$ is obviously complete. Therefore, the condition for the theorem is equivalent to the necessary and sufficient condition for that CSP (X, Z, V, C) has a solution. Thus, assuming that the complete value set of CSP (X, Z, V, C) is V and that reachable value set $r(Xh: wk)$ of Xh for value wk of variable Xk in CSP (X, Z, V, C) is $r(Xh: wk)$, it is demonstrated that the theorem condition is a sufficient condition, as follows.

First, assume that, if V is complete and $wj \in r(Xj: wk) \subset Vj$, then $\{r(Xh: wk) \cap r(Xh: wj)\} \neq \phi$.

Assume that for any Xh, $\{r(Xh: wk) \cap r(Xh: wj)\} = \phi$.

Vh includes no more than two elements $\{wh, wh\}$, and reachable value set $r(Xh: wk) \neq \phi$ and reachable value set $r(Xh: wj) \neq \phi$.

Thus, if $wh \in r(Xh: wk)$, then $wh \in r(Xh: wj)$.

Here, reachable value set $r(Xh: wk)$ does not include wh and reachable value set $r(Xh: wj)$ does not include wh.

That is, there is a path P from Xk to Xh, and a value on a list of mutually connectable values on P beginning with wk is only wh.

This gives $r(Xj: wk) \subset r(Xj: wh)$.

In addition, since reachable value set $r(Xh: wj)$ does not include wh, reachable value set $r(Xj: wh)$ does not include wj.

If $wj \in r(Xj: wh)$, then, there is a list of mutually connectable values $\{wh, wqm, \ldots, wql, wj\}$ on a path $P=\{Xh, Xqm, \ldots, Xql, Xj\}$ which connects Xh and Xj by going into the reverse direction of a path $Q=\{Xj, Xql, \ldots, Xqm, Xh\}$. This resulting in that $\{wj, wql, \ldots, wqm, wh\}$ is a list of mutually connectable values on Q connecting Xj and Xh, and that $wh \in r(Xh: wj)$.

Thus, wj is not an element of reachable value set $r(Xj: wk)$. This conflicts with the following assumption:

$wj \in r(Xj: wk)$.

That is, if V is complete and $wj \in r(Xj: wk)$, then, it is satisfied on all Xh that $\{r(Xh: wk) \cap r(Xh: wj)\} \neq \phi$.

Next, it is demonstrated that, if V is complete, a list of V elements $\{w1, \ldots, wN\}$ exists in variable set $\{X1, \ldots, XN\}$ and, for any Xk, Xj, and Xh, $\{r(Xh: wk) \cap r(Xh: wj)\} \neq \phi$.

First, if V is complete, there is a value w1 ($\in V$) of variable X1 and there is a value w2 on X2, satisfying that $w2 \in r(X2: w1) \subset V$.

From the above-described characteristic, it is satisfied on any Xh that $\{r(Xh: w1) \cap r(Xh: w2)\} \neq \phi$.

Therefore, assume that there is a list of V elements $\{w1, \ldots, wn\}$ on $\{X1, \ldots, Xn\}$ $(n \geq 2)$ and that, if $k \leq n$ and $j \leq n$, it is satisfied on any Xh that $\{r(Xh: wk) \cap r(Xh: wj)\} \neq \phi$.

Then, if subsets A1 and A2 of set A including two elements satisfy $A1 \cap A2 \neq \phi$, then $A1 \supset A2$ or $A2 \supset A1$.

Since each variable Xh includes no more than two values, $\{w1, \ldots wn\}$ may be re-arranged into $\{wk1, \ldots, wkn\}$ in order to satisfy the following condition:

$r(Xh: wk1) \supset r(Xh: wk2) \supset \ldots \supset r(Xh: wkn)$.

Thus, if $h=n+1$, then $\{r(Xn+1: w1) \cap r(Xn+1: w2) \cap \ldots \cap r(Xn+1: wn)\} \neq \phi$.

and there is an element wn+1 as follows:

$wn+1 \in \{r(Xn+1: w1) \cap r(Xn+1: w2) \cap \ldots \cap r(Xn+1: wn)\}$.

Therefore, for a list of values $\{w1, \ldots, wn, wn+1\}$ of $\{X1, \ldots, Xn, Xn+1\}$, if $\{k, j \leq n+1\}$, the following is true:

$\{r(Xh: wk) \cap r(Xh: wj)\} \neq \phi$.

That is, if V is found to be complete according to the mathematical induction, there is a list of values $\{w1, \ldots, wN\}$ for $\{X1, \ldots, XN\}$. And, the following is true for any Xh:

$\{r(Xh: wk) \cap r(Xh: wj)\} \neq \phi$.

Clearly, $\{w1, \ldots, wN\}$ is a solution of CSP (X, Z, V, C). In the above-described procedure to find a solution, there is not any constraint on selecting variable X1 and its value w1 except the existence of the only one constraint as follows:

$w1 \in V$.

Therefore, it is understood that there is a solution of CSP (X, Z, V, C) and that the solution includes value w, satisfying:

w∈V.

(6) Effects of the Embodiment

As described above, a set of alternatives provided for a plurality of parts of a given problem to be solved is divided into a plurality of subsets such that each subset has not more than two alternatives for each part. Calculation of a solution for a subset in which each part has not more than two alternatives, requires a very short period of time even if the problem includes many parts. This means that the sum of the times required for finding solutions for all the subsets, is much shorter than the time required for finding a solution for the original problem as it is. Thus the system is useful for solving a large constraint satisfaction problem at a high speed.

In addition, the completing of a reachable value set allows a user to calculate a solution of a problem from subsets of the problem in a very short time even if the problem includes many parts. Thus the system greatly reduces the time required for calculating a solution of the whole problem.

That is, in this embodiment, a problem of assigning consistently an alternative for each part from more than two alternatives permissible for each part is translated into a plurality of subproblems of assigning consistently an alternative for each part from not more than two alternatives permissible for each part. The high-speed processing of the translated respective subproblems gives a high-speed processing of the original assignment problem.

In this embodiment, the solution calculation stage virtually determines the amount of memorizations and the amount of calculation. According to the present invention, the amount of calculation required for finding a consistent combination of alternatives is not proportional to $2^N$, as in the conventional system, but of the order of $O(4c \cdot N^2)$, where N is the number of parts and c is the average number of parts having a constraint relation for each part. In this case, the amount of necessary memorizations is of the order of $O(4 \times N^2)$. Therefore, even if N is 100, the amount of calculation is of the order of O(400, 000), resulting in that a combination of alternatives may be calculated within a time expendable in practical applications.

Except for special cases, in the conventional system, all possible combinations must be examined. More specifically, in the conventional system, the operations of selecting an alternative for a part and checking whether it is consistent with an alternative selected for the next part. The operations must be done, the number of times, equal to the number of all possible combinations of two parts. Therefore, in an extreme case, the amount of calculation for finding a consistent combination of alternatives is of the order of $O(100 \times c/2 \times 2^{100})$ or more. On the contrary, according to the present invention, the amount of calculation is reduced to not more than $\frac{1}{2}^{90}$.

The number of instructions required for each calculation carried out by a computer is of the order of 10 and, therefore, the amount of calculation required for the all calculation for finding a consistent combination of alternatives is of the order of $O(40c \times N^2)$. Assume that there are 100 parts each having not more than two alternatives and that there are 10 parts having a constraint relation for each part on the average. In this case, the amount of calculation is $O(400 \times 100^2) = O(4,000,000)$ at the maximum.

When each part has three or more alternatives, in the conventional system, in which all possible combinations must be examined, the amount of calculation is of the order of $O(N \times c \times d^N)$, where N is the number of parts and c is the average number of parts having a constraint relation for each part. In the system according to the present invention, the amount of calculation is reduced to that of the order of $O(4c \times N^2) \times (d/2)^N$.

Assume that there are 20 parts each having four alternatives and that there are four parts having a constraint relation for each part on the average. In this case, the required amount of calculation in the conventional system is of the order of $O(80 \times 4^{20}) = O(80 \times 2^{40})$, while the required amount of calculation in the system according to the present invention is of the order of $O(6,400 \times 2^{20})$. This means that, even if each calculation is implemented by approximately 10 steps of instructions, the amount of calculation in the system according to the present invention is reduced to not more than 1/500 compared with that in the conventional system.

In this case, calculation of the order of $O(16 \times 400 \times 10) = O(64,000)$ must be carried out on $2^{20}$ {V1 (k1), ..., VN(kN)}. The time required for completing this calculation by a standard workstation or a personal computer is some 10 minutes. Since each of $2^{20}$ subsets may be calculated independently, working of about 10 parallel computers at a time may find all solutions in a few minutes.

The solving of a problem at a high speed according to the present invention, as described above, allows a system using an expert system to find a solution within a time expendable in practical applications.

In many problems which have many parts, the number of practical alternatives is usually limited. Therefore, in most cases, since constraint on a combination of alternatives does not exist for every part pair, a set of parts may be divided into a number of sets which are mutually independent as far as constraints are concerned. In addition, even if there are many alternatives that may be used, substantially meaningful alternatives may be limited. For example, if an evaluation value is assigned to each alternative, the number of alternatives satisfying a specified evaluation value is limited. Under these circumstances, the number of effective alternatives may be about twenty even if in a substantial complicated problem which has many parts. Thus the system according to the present invention may be applied to various problems and systems in many fields to solve or improve them.

In addition, the use of the method of the present invention in conjunction with a method such as Adaptive Consistency Algorithm (ACA) which localizes the effect of constraints, allows more large number of parts to be handled.

(7) Other Embodiments

Figure 28:
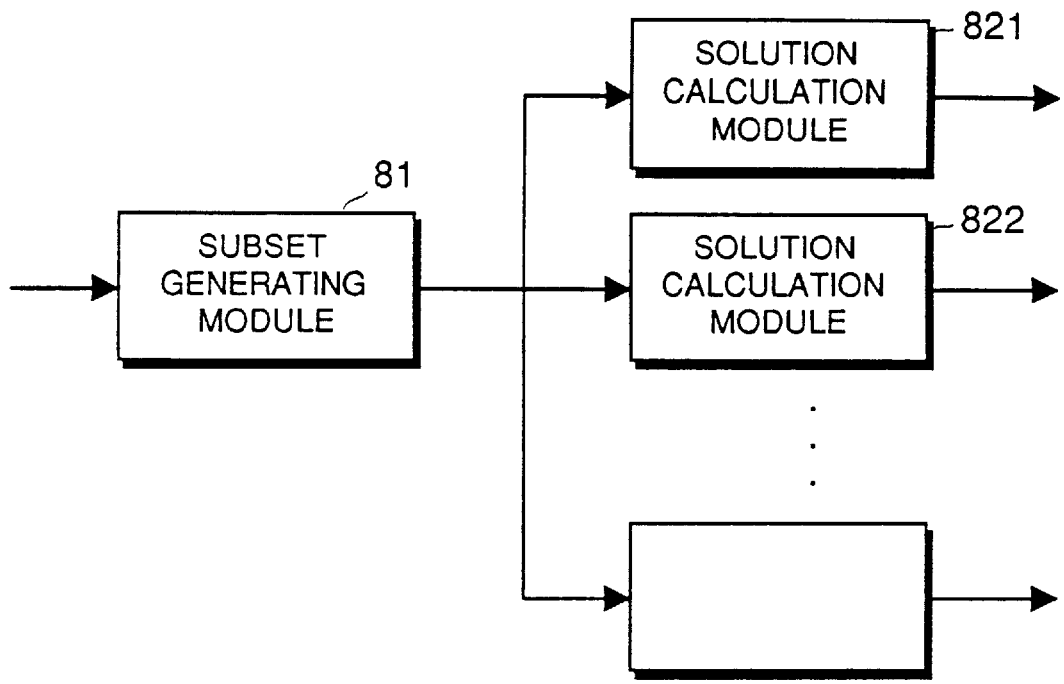
FIGS. 28 and 29 are diagrams showing the configuration of different embodiments of the present invention.
Figure 29:
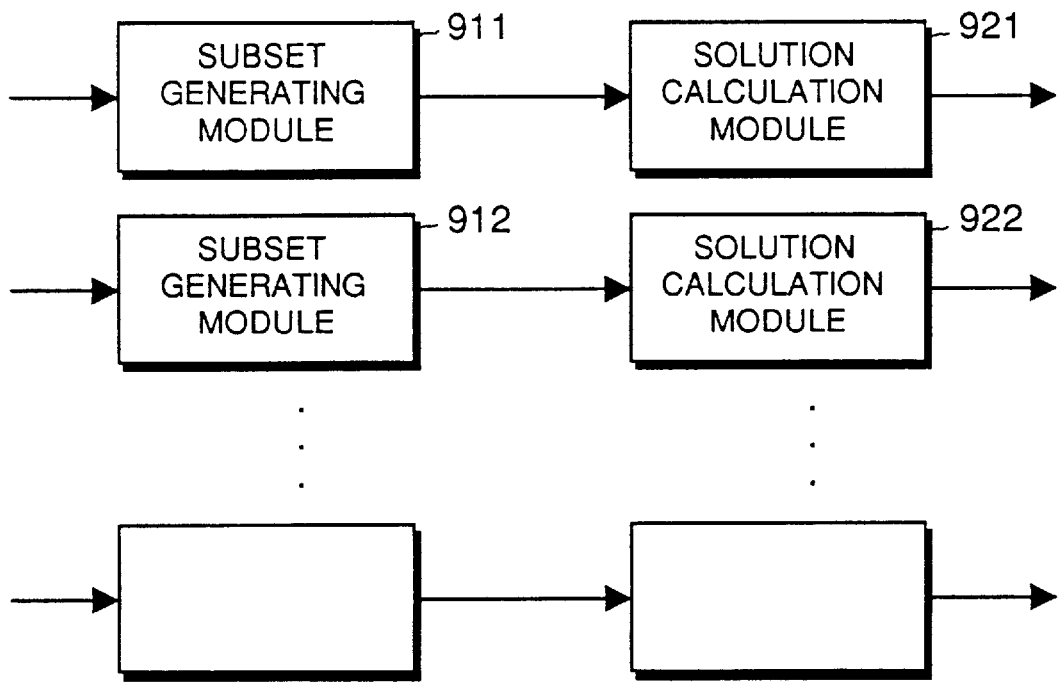

The present invention is not limited to the embodiment described above but includes other embodiments described below. For example, although all processing is serially processed in the above embodiment, some parts of processing for solving a problem may be carried out in parallel to reduce the processing time. FIGS. 28 and 29 show an example of a system which calculates a solution in parallel.

FIG. 28 shows a system comprising a single subset generating module 81 and a plurality of solution calculation modules 82 (modules 821, 822, . . . ). In this system, single module 81 sends different subsets of alternatives, {V1(k1), V2(k2), . . . , VN(kN)}, to each of modules 82. The modules 82 receive the different subsets and calculate in parallel, solutions for them.

FIG. 29 shows an example of a system comprising a plurality of subset generating modules 91 (modules 911, 912, . . . ), which correspond to modules 92 (modules 921, 922, . . . ), respectively. The modules 91 generate in parallel, subsets of alternatives in a specified range, and modules 92 calculate in parallel, a solution for the subsets of alternatives generated by modules 91.

These systems allow a user to make a parallel processing of dividing a set of alternatives of a problem into a plurality of subsets or solving for the subsets, resulting in high-speed processing even if the problem is very large.

In the above embodiments, a technique used in a system or a method for solving a constraint satisfaction problem are described. According to the present invention, substantially the same technique is used in a system or method for constructing a system. That is, parts and alternatives for them of a constraint satisfaction problem correspond to parts and alternatives for them of a system to be constructed, respectively, in the constructing system or method. Also, a solution obtained in the embodiment corresponds to the configuration of a system to be constructed. For example, each part of the problem corresponds to a predetermined part of a system to be constructed, such as a machine or a program, while a plurality of alternatives for each part of a problem correspond to a plurality of alternatives that may be selected for each part to construct the machine or the program. For example, between alternatives of each two parts of a machine, there is a constraint, such as that a nut fitting a bolt must be used in a part adjacent to a specific part where the bolt is used, that a gear engaging with a pawl must be used in a part adjacent to a specific part where the pawl is used instead of a bolt.

According to the present invention, subsets may be used for only making an analysis instead of obtaining a final solution. The present invention is usually carried out by controlling a computer with the use of a program. A memory storing such a computer-executable program code is also an embodiment of the present invention.

As explained above, the present invention provides a high-speed calculation of a large constraint satisfaction problem and significantly improves the practicability of complicated data processing fields such as artificial intelligence. At the same time, the present invention provides a system or method for constructing a system that may be considered as a constraint satisfaction problem.

While a preferred embodiment has been described, variations thereto will occur to those skilled in the art of the scope of the present inventive concepts which are delineated by the following claims.

What is claimed is:

1. A system for solving a constraint-satisfaction problem including a plurality of parts for each of which a plurality of alternatives to implement each part are provided to form a set of alternatives for each part and form a string of the alternative sets for said plurality of parts, when a constraint exists on a combination of alternatives to be selected respectively from each alternative set for different parts in said plurality of parts, said system comprising:

dividing means for dividing each alternative set for each part of said constraint-satisfaction problem into a plurality of subsets such that a maximum number of elements included in each subset is limited to two; and analyzing means for analyzing a combination of alternatives, which are selected respectively from each subset of a combination of subsets that are selected respectively from each plurality of subsets for different parts of said constraint-satisfaction problem, to check whether the combination of alternatives satisfies said constraint, whereby allowing a solution of said constraint-satisfaction problem to be calculated from the analyzed combination.

2. A system as claimed in claim 1, said analyzing means comprising:

calculating means for calculating a reachable value set representing a combination of alternatives defined on each part satisfying said constraint for each of the subsets divided by said dividing means;

completing means for completing the reachable value set calculated by said calculating means; and calculating means for calculating a solution from the reachable value set completed by said completing means.

3. A method for solving a constraint-satisfaction problem including a plurality of parts for each of which a plurality of alternatives to implement each part are provided to form a set of alternatives for each part and form a string of the alternative sets for said plurality of parts, when a constraint exists on a combination of alternatives to be selected respectively from each alternative set for different parts in said plurality of parts, said method comprising the steps of:

dividing each alternative set for each part of said constraint-satisfaction problem into a plurality of subsets such that a maximum number of elements included in each subset is limited to two; and analyzing a combination of alternatives, which are selected respectively from each subset of a combination of subsets that are selected respectively from each plurality of subsets for different parts of said constraint-satisfaction problem, to check whether the combination of alternatives satisfies said constraint, whereby allowing a solution of said constraint-satisfaction problem to be calculated from the analyzed combination.

4. A memory storing computer-executable program code for solving a constraint-satisfaction problem including a plurality of parts for each of which a plurality of alternatives to implement each part are provided to form a set of alternatives for said plurality of parts, when a constraint exists on a combination of alternatives selected respectively from the set of alternatives for different parts in said plurality of parts, said program code comprising:

means for causing a computer to divide each alternative set for each part of said constraint-satisfaction problem into a plurality of subsets such that a maximum number of elements included in each subset is limited to two; and means for causing a computer to analyze a combination of alternatives, which are selected respectively from each subset of a combination of subsets that are selected respectively from each plurality of subsets for different parts of said constraint-satisfaction problem, to check whether the combination of alternatives satisfies said constraint, whereby allowing a solution of said constraint-satisfaction problem to be calculated from the analyzed combination.

* * * * *

UNITED STATES PATENT AND TRADEMARK OFFICE
CERTIFICATE OF CORRECTION

PATENT NO. : 6,336,110 B1
DATED : January 1, 2002
INVENTOR(S) : Tamura et al.

Page 1 of 1

It is certified that error appears in the above-identified patent and that said Letters Patent is hereby corrected as shown below:

Title page,
Insert item [45], and item [*] as follows:

-- [45] Date of Patent: *Jan. 1, 2002 --

-- [*] Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days. --

Signed and Sealed this

Thirtieth Day of April, 2002

*Attest:*

JAMES E. ROGAN
*Attesting Officer*     *Director of the United States Patent and Trademark Office*